US012699364B2

(12) United States Patent
Cherian et al.

(10) Patent No.: US 12,699,364 B2
(45) Date of Patent: Aug. 4, 2026

(54) SYSTEM AND METHOD FOR CONTROLLING AN ENTITY

(71) Applicant: Mitsubishi Electric Research Laboratories, Inc., Cambridge, MA (US)

(72) Inventors: Anoop Cherian, Cambridge, MA (US); Sudipta Paul, Riverside, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 697 days.

(21) Appl. No.: 17/823,387

(22) Filed: Aug. 30, 2022

(65) Prior Publication Data

US 2024/0069501 A1     Feb. 29, 2024

(51) Int. Cl.
| | |
|---|---|
| *G05B 13/02* | (2006.01) |
| *G10L 15/06* | (2013.01) |
| *G10L 15/16* | (2006.01) |
| *G10L 15/22* | (2006.01) |

(52) U.S. Cl.
CPC .......... *G05B 13/027* (2013.01); *G10L 15/063* (2013.01); *G10L 15/16* (2013.01); *G10L 15/22* (2013.01); *G10L 2015/0635* (2013.01); *G10L 2015/223* (2013.01)

(58) Field of Classification Search
CPC ........ G05B 13/027; G05B 2219/40116; G05B 2219/40499; G10L 15/063; G10L 15/16; G10L 15/22; G10L 2015/0635; G10L 2015/223; G10L 25/51; B25J 9/163; B25J 9/161; B25J 9/1664; B25J 9/1697; B25J 13/003

USPC .......... 700/246, 250; 701/23; 706/15, 16, 52
See application file for complete search history.

(56) References Cited

U.S. PATENT DOCUMENTS

| | | | | |
|---|---|---|---|---|
| 11,645,479 | B1 * | 5/2023 | Coursey ................. | G06F 40/58 |
| 2018/0357552 | A1 * | 12/2018 | Campos ................ | G06N 5/043 |
| 2019/0324795 | A1 * | 10/2019 | Gao ...................... | G06F 9/4843 |
| 2021/0158162 | A1 * | 5/2021 | Hafner .................. | G06N 3/006 |

(Continued)

OTHER PUBLICATIONS

Zhang, Jiaping, Tiancheng Zhao, and Zhou Yu. "Multimodal hierarchical reinforcement learning policy for task-oriented visual dialog ." arXiv preprint arXiv: 1805.03257 (Year: 2018).*

(Continued)

*Primary Examiner* — Ellis B. Ramirez
(74) *Attorney, Agent, or Firm* — Gene Vinokur

(57) ABSTRACT

A controller for controlling an entity is provided. The controller comprises a memory to store a hierarchical multimodal reinforcement learning (RL) neural network, and a processor. The hierarchical multimodal RL neural network includes a first level controller and two second level controllers. Each of the second level controllers comprise a first sub level controller relating to a first modality and a second sub level controller relating to a second modality. The first modality is different from the second modality. The processor is configured to select one of the two second level controllers to perform a first sub-task relating to a task, using the first level controller, based on input data and a state of the hierarchical multimodal RL neural network. The selected second level controller is configured to determine a set of control actions to perform the first sub-task, and control the entity based on the set of control actions.

20 Claims, 15 Drawing Sheets

(56) References Cited

U.S. PATENT DOCUMENTS

| | | | | |
|---|---|---|---|---|
| 2021/0232589 | A1* | 7/2021 | Nelson | H04L 67/5651 |
| 2021/0240265 | A1* | 8/2021 | Pilly | A61B 5/0095 |
| 2021/0268645 | A1* | 9/2021 | Miyazawa | G05B 19/0426 |
| 2021/0403031 | A1* | 12/2021 | Alvarez | G01C 21/3461 |
| 2022/0055221 | A1* | 2/2022 | Ko | B25J 9/163 |
| 2022/0105624 | A1* | 4/2022 | Kalakrishnan | B25J 9/163 |

OTHER PUBLICATIONS

Rosenthal, Stephanie, Joydeep Biswas, and Manuela M. Veloso. "An effective personal mobile robot agent through symbiotic human-robot interaction." AAMAS. Vol. 10. 2010. (Year: 2010).*

SoundSpaces: Audio-Visual Navigation in 3D Environments Changan Chen*, Unnat Jain*, Carl Schissler, Sebastia Vicenc Amengual Gari, Ziad Al-Halah, Vamsi Krishna Ithapu, Philip Robinson, Kristen GraumanECCV 2020.

Zhu, Yi, et al. "Self-Motivated Communication Agent for Real-World Vision-Dialog Navigation." Proceedings of the IEEE/CVF International Conference on Computer Vision. 2021.

Nguyen, Khanh, and Hal Daumé III. "Help, anna! visual navigation with natural multimodal assistance via retrospective curiosity-encouraging imitation learning." arXiv preprint arXiv:1909.01871 (2019).

* cited by examiner

402

Retrieve two lower-level policies to be used to determine navigation steps for the task

404

Select one of the two lower-level policies by the top-level policy configured in the first level controller

406

Perform the sub task associated with the task by using the selected lower-level policy

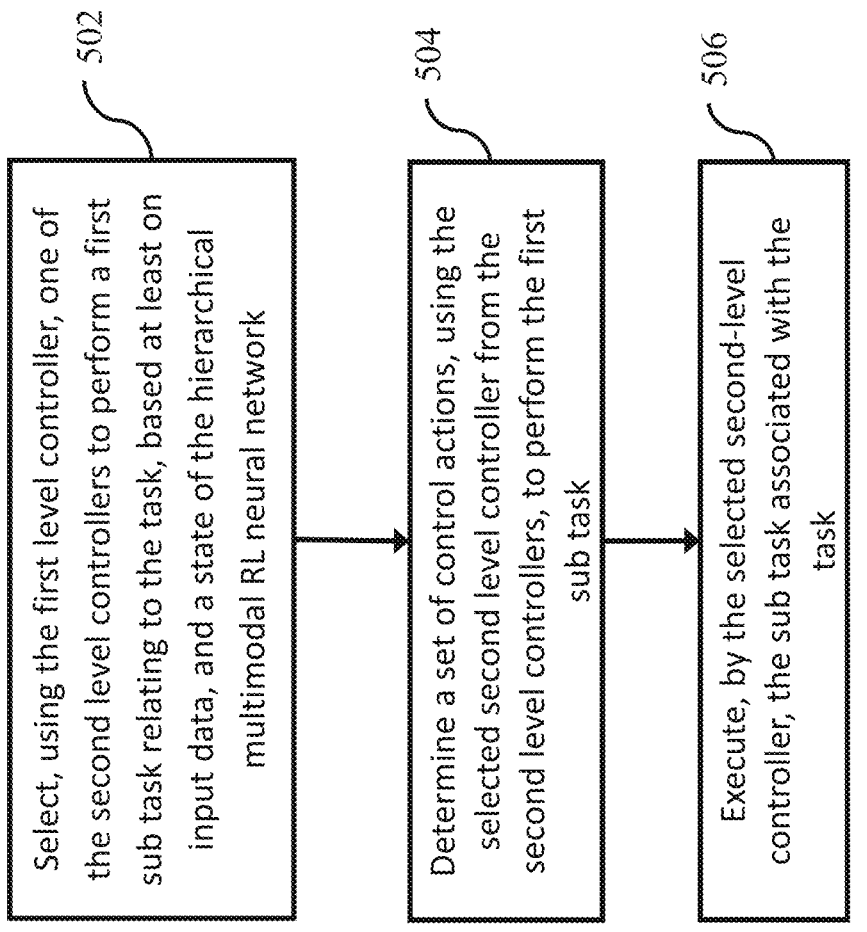

Select, using the first level controller, one of the second level controllers to perform a first sub task relating to the task, based at least on input data, and a state of the hierarchical multimodal RL neural network

502

Determine a set of control actions, using the selected second level controller from the second level controllers, to perform the first sub task

504

Execute, by the selected second-level controller, the sub task associated with the task

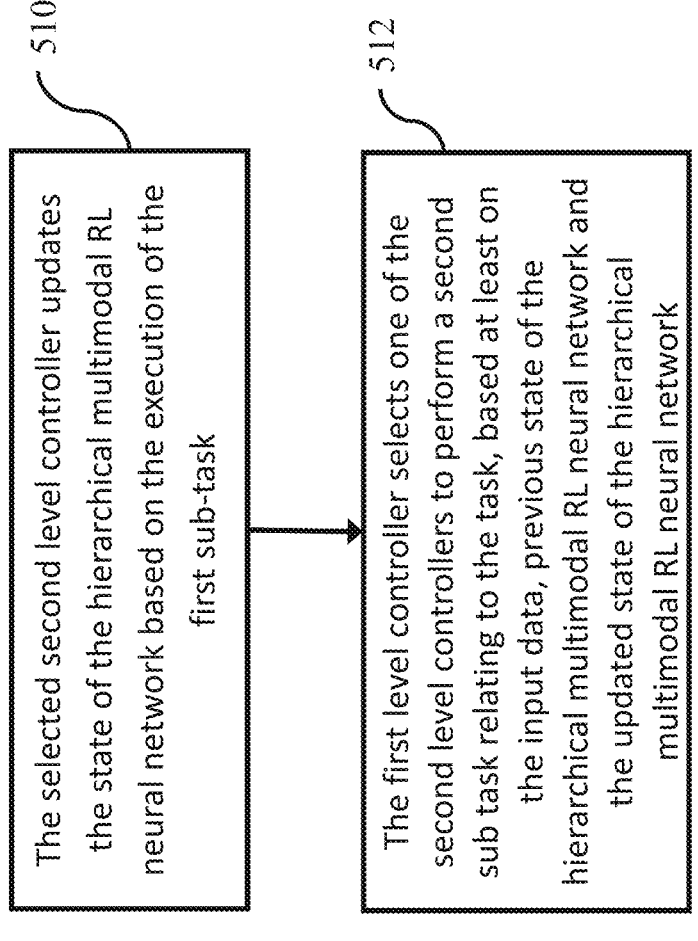

510

The selected second level controller updates the state of the hierarchical multimodal RL neural network based on the execution of the first sub-task

512

The first level controller selects one of the second level controllers to perform a second sub task relating to the task, based at least on the input data, previous state of the hierarchical multimodal RL neural network and the updated state of the hierarchical multimodal RL neural network

FIG. 5B

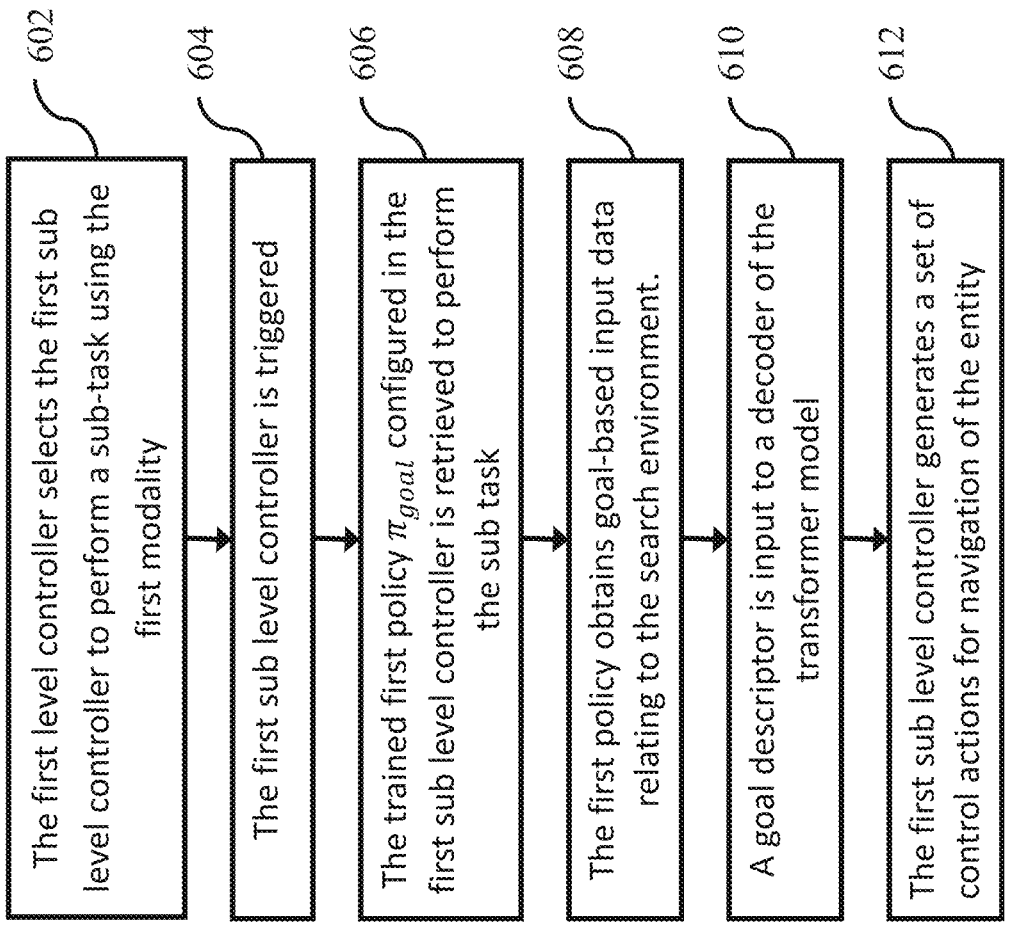

602 The first level controller selects the first sub level controller to perform a sub-task using the first modality 604 The first sub level controller is triggered 606 The trained first policy $\pi_{goal}$ configured in the first sub level controller is retrieved to perform the sub task 608 The first policy obtains goal-based input data relating to the search environment.

610 A goal descriptor is input to a decoder of the transformer model

612 The first sub level controller generates a set of control actions for navigation of the entity

FIG. 6A

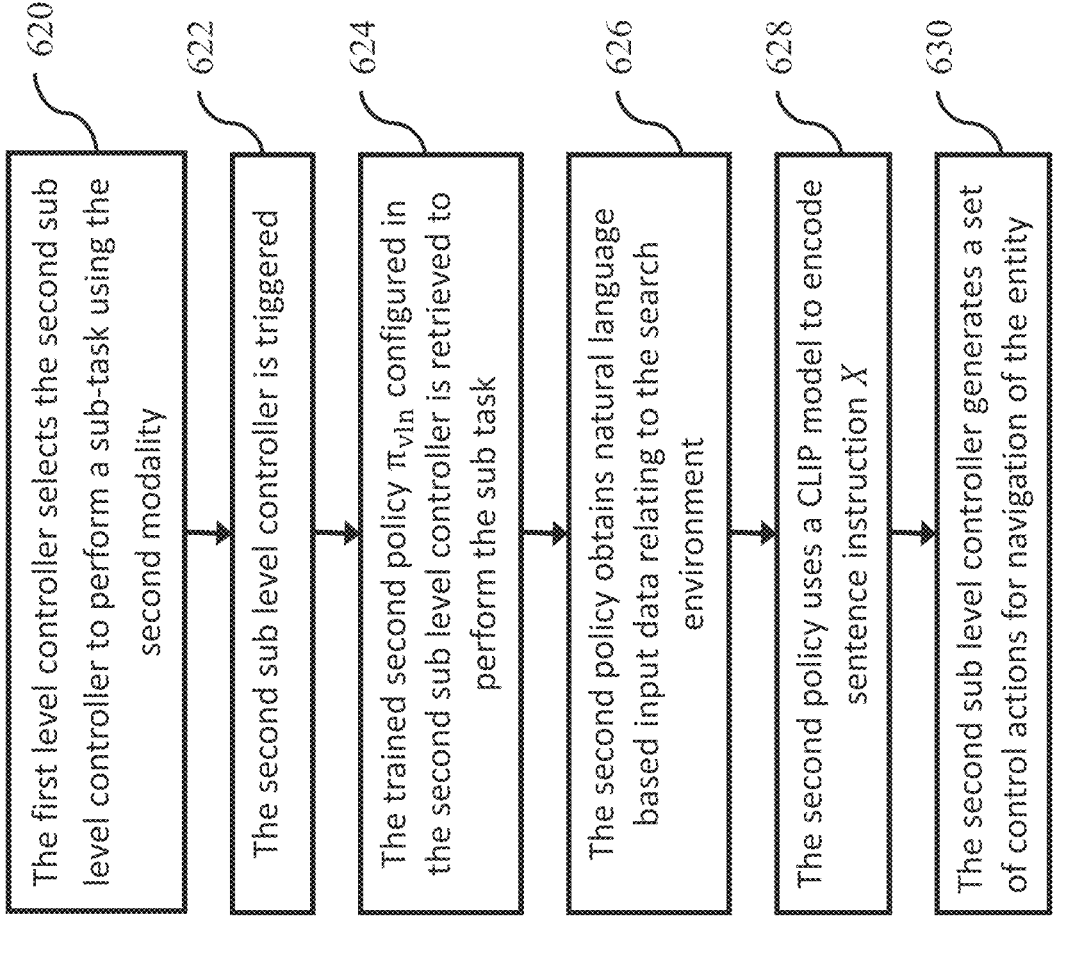

620

The first level controller selects the second sub level controller to perform a sub-task using the second modality

622

The second sub level controller is triggered

624

The trained second policy $\pi_{vln}$ configured in the second sub level controller is retrieved to perform the sub task

626

The second policy obtains natural language based input data relating to the search environment

628

The second policy uses a CLIP model to encode sentence instruction $X$

630

The second sub level controller generates a set of control actions for navigation of the entity

The first level controller receives input

704

The first level controller determines an action space

706

The first level controller determines a resource constraint associated with selection of each of the at least two second level controllers

708

The first level controller learns when to interact with the oracle directly using natural language

SYSTEM AND METHOD FOR CONTROLLING AN ENTITY

TECHNOLOGICAL FIELD

The invention relates generally to entity control, and more particularly to training and controlling an entity to perform a specific task.

BACKGROUND

Robotic agents that assist humans are central to achieving the promise of robotics and artificial intelligence (AI). A recent development in robotics and AI has been in designing entities (such as, agents or robots) that are capable of autonomously navigating realistic virtual worlds for solving pre-defined tasks. For example, in vision and-language navigation (VLN), an entity or an agent may either navigate to a goal location following instructions provided in natural language or explore a visual world seeking answers to a given natural language.

However, the VLN entity or agents are assumed to be deaf, i.e., they cannot hear any audio events or receive audio cues in an environment. Therefore, the VLN entities that are deployed and operate in realistic virtual worlds may be unable to navigate reliably through such environments. To address this shortcoming, navigation tasks may be reformulated for localizing an audio source in a virtual scene. However, the reformulations of the navigation tasks are without any natural language instructions for the entity or the agent to follow. Therefore, the entity or the agent may still fail to operate reliably in realistic virtual worlds.

Navigation in realistic virtual worlds is not only audio-visual but is often complex and stochastic. In particular, the entity or the agent navigating in the realistic virtual worlds may have to seek a synergy between different modalities of input, such as audio input, visual input, and language input, for successful navigation. For example, in an elder care center, a robotic agent may need to find where a thud of a falling person is heard from. On the one hand, such a sound is sporadic, and thus the entity or the agent must use semantic knowledge of the audio-visual modality to reach a goal. On the other hand, such an event needs to be catered to timely and the entity or the agent may have to minimize the number of navigation mistakes it makes. In order to minimize mistakes, the entity or the agent may require human help when it is uncertain of its navigation actions in order to reach the goal.

A key challenge of such an input having multiple modalities for a navigation task is the inability of the entity or the agent to decide when to ask the query, and when to follow the audio-visual cues to reach the goal.

To that end, querying an oracle a large number of times may hurt agent autonomy and may be less preferred if the oracle is a human. On the other hand, querying the oracle a smaller number of times may make the entity or the agent explore an environment endlessly without reaching the goal. In addition, instructions provided to the entity or the agent in natural language may be difficult to translate to navigable instructions owing to noise and complexity of natural language. Therefore, the entities or agents suffer from various limitations, such as increased time of completion of a navigation task, failure to complete the navigation task, performing the navigation task incorrectly, loss of feasibility of path planning to complete the navigation task and compromised path quality (such as extra maneuvers, increased cost, and reduced accuracy) owing to restriction on number of modalities of input for completing the task, especially in a realistic virtual world.

SUMMARY

It is an object of some embodiments to disclose audio-visual-language (AVL) embodied navigation techniques that allow localization of an audio source in a realistic visual world. It is another object of some embodiments to disclose an audio-visual-language (AVL) embodied navigation method where an audio source is localized in a realistic visual world. It is another object of some embodiments to disclose that an entity uses audio-visual-language cues to navigate to the audio source. It is another object of some embodiments to disclose a new type of parameterization to generate navigation steps to reach to the audio source, such that the entity implicitly models its uncertainty in deciding navigation steps and seeks help from an oracle for navigation instructions. It is another object of some embodiments to provide such a system and a method that decides a type of input cue to be received by selecting a modality from, for example, audio, visual or short natural language sentences.

Some embodiments are based on the realization that the entity may have to decide when to ask a query or seek help from an oracle for navigation instructions, and when to follow the audio-visual cues to reach a goal or the audio source. The determination for when to query an oracle or navigate based on audio-visual cues is crucial as asking too many queries may hurt agent autonomy and is less preferred if the oracle is a human and querying too few times may make the entity explore the scene endlessly without reaching the goal.

While instructions provided to the entity is in natural language, such instructions are often noisy and difficult to correctly translate to navigable instructions. The determination of when to query the oracle need to be considered which may result in less time for translating the natural language instructions and reaching the goal.

Some embodiments are based on the understanding that hierarchical reinforcement learning framework, consisting of learning a high-level policy (referred to as first level controller) to decide of when to query and a plurality of low-level policies (referred to as second level controllers) to navigate may reduce errors or mistakes during the navigation and prevent endless maneuvers of the entity. This may further reduce time of reaching the goal. However, modeling uncertainty to decide when to query the oracle, where the uncertainty is either quantified in terms of the action prediction probabilities or using heuristics to check when the entity is lost to navigate may be unable to reduce time of completing navigation task to reach the goal. Further, identifying when the entity is making mistakes and to incorporate this information for identifying when to query may require complete analysis of future actions of the entity. This may also fail to prevent mistakes or unnecessary maneuvers of the entity thereby failing to reduce the time to complete the navigation task. Therefore, it is an object of some embodiments to provide such a method that learns when to query based on the current observation and history information by interacting and exploring the environment and collecting rewards to achieve faster navigation to the goal with less mistakes in maneuvering.

It is an object of some embodiments to provide semantic audio-visual-language navigation for when an audio source is sporadic, ambiguous, and distractor sound (or noise) exists alongside the audio source. Additionally, it is an object of some embodiments to provide an entity equipped to ask for help or query an oracle such that a success rate of the entity in reaching the goal is improved. Specifically, it is an object of some embodiments to increase success rate and decrease path length when the entity is allowed to ask a specific number of questions or queries.

The audio-visual-language navigation aims to learn to use audio-visual cues to navigate to the audio source, and also learns to implicitly model its uncertainty in deciding the navigation steps and seeks help from an oracle for navigation instructions provided in short natural language sentences.

Some embodiments of this disclosure are based on unifying and generalizing audio-visual navigation with natural language instructions to build a complete audio-visual-language embodied AI navigation entity.

Some embodiments of this disclosure are based on a new type of hierarchical reinforcement learning framework that jointly learns policies for the entity to decide when to query the oracle, how to navigate using audio-goal, and how to use the provided natural language instructions.

Some embodiments of this disclosure are based on semantic audio-visual navigation on datasets with large-scale real-world environments with a variety of semantic objects and their sounds.

Accordingly, one embodiment discloses a controller for controlling an entity. The controller comprises a memory to store a hierarchical multimodal reinforcement learning (RL) neural network. The hierarchical multimodal RL neural network includes a first level controller and at least two second level controllers. The at least two second level controllers comprises at least a first sub level controller relating to a first modality and a second sub level controller relating to a second modality. The first modality is different from the second modality. The controller comprises a processor configured to select one of the at least two second level controllers to perform a first sub-task relating to a task, using the first level controller. The selection is based at least on input data, and a state of the hierarchical multimodal RL neural network. The processor is configured to cause the selected second level controller from the at least two second level controllers to determine a set of control actions to perform the first sub-task. The processor is configured to control the entity based on the set of control actions determined by the selected second level controller. The processor is further configured to update the state of the hierarchical multimodal RL neural network on the execution of the first sub-task, using the selected second level controller. The processor is further configured to select one of the at least two second level controllers to perform a second sub-task relating to the task, based at least on the input data, previous state of the hierarchical multimodal RL neural network and the updated state of the hierarchical multimodal RL neural network, using the first level controller. The second sub-task is performed after the first sub-task for completing the task.

The processor is further configured to determine a resource constraint associated with selection of each of the at least two second level controllers. The processor is configured to select one of the at least two second level controllers, based on the resource constraint, using the first level controller.

The input data or the state of the hierarchical multimodal RL neural network, as used by the first sub level controller relating to the first modality and the second sub level controller relating to the second modality, are different.

The first sub level controller is configured to determine the set of control actions based on video information, and wherein the second sub level controller is configured to determine the set of control actions based on audio information.

The first modality relating to the first sub level controller is an audio or video based modality and the second modality relating to the second sub level controller is a natural language-based modality.

The first level controller is biased toward the selection of the first sub level controller.

The first sub level controller is configured to determine the set of control actions based on at least one of: sensor-based audio information or sensor-based video information. The second sub level controller is configured to determine the set of control actions based on a natural language instruction.

When the selected second level controller is the first sub level controller relating to the first modality, the processor is further configured to determine the set of control actions based at least on a first set of state variables associated with the state of the hierarchical multimodal RL neural network and the input data, using the first sub level controller relating to the first modality comprising audio or video based modality. The input data includes at least one of: the sensor-based audio information, or the sensor-based video information. The processor is configured to update, using the first sub level controller, the first set of state variables based on the execution of the first sub-task.

When the selected second level controller is the second sub level controller relating to the second modality comprising natural language-based modality, the processor is further configured to determine the set of control actions based at least on a second set of state variables associated with the state of the hierarchical multimodal RL neural network and the input data, using the second sub level controller. The input data includes the natural language instruction. The first set of state variables is different than the second set of state variables. The processor is further configured to update, using the second sub level controller, the second set of state variables based on the execution of the first sub-task.

The processor is configured to determine a belief state associated with the hierarchical multimodal RL neural network. The processor is configured to modify the belief state of the hierarchical multimodal RL neural network based on the updated state of the hierarchical multimodal RL neural network and the execution of the first sub-task, using the selected second level controller.

When the selected second level controller is the second sub level controller relating to the second modality and the second modality is a natural language-based modality, the processor is configured to generate a new belief state based on the execution of the set of control actions associated with the first sub-task, using the second sub level controller. The processor is configured to clear a current belief state, using the second sub level controller.

The first level controller uses a learned policy having a reinforcement learning network to determine when to select one of the at least two second level controllers.

In some embodiments, the task is a navigation task for navigation of the entity from an initial state till a target state. The first modality relating to the first sub level controller is an audio or video based modality and the second modality relating to the second sub level controller is a natural language-based modality. When the first level controller selects the first sub level controller, the first sub level controller controls navigation of the entity based on sensor-based information. When the first level controller selects the second sub level controller, the second sub level controller causes the entity to query for natural language embodied navigation instructions, and the second sub level controller controls navigation of the entity based on a natural language instruction.

Another embodiment discloses a method for controlling an entity using a controller having a hierarchical multimodal reinforcement learning (RL) neural network. The hierarchical multimodal RL neural network includes a first level controller and at least two second level controllers. The at least two second level controllers comprising at least a first sub level controller relating to a first modality and a second sub level controller relating to a second modality. The first modality is different from the second modality. The method comprises selecting one of the at least two second level controllers to perform a first sub-task relating to a task, using the first level controller. The selection is done based at least on input data, and a state of the hierarchical multimodal RL neural network. The method comprises causing the selected second level controller from the at least two second level controllers to determine a set of control actions to perform the first sub-task. The method comprises controlling the entity based on the set of control actions determined by the selected second level controller.

Yet another embodiment discloses a non-transitory computer readable storage medium embodied thereon a program executable by a processor for performing a method for controlling an entity using a controller having a hierarchical multimodal reinforcement learning (RL) neural network. The hierarchical multimodal RL neural network includes a first level controller and at least two second level controllers. The at least two second level controllers comprising at least a first sub level controller relating to a first modality and a second sub level controller relating to a second modality. The first modality is different from the second modality. The method comprises selecting one of the at least two second level controllers to perform a first sub-task relating to a task, using the first level controller. The selection is done based at least on input data, and a state of the hierarchical multimodal RL neural network. The method comprises causing the selected second level controller from the at least two second level controllers to determine a set of control actions to perform the first sub-task. The method comprises controlling the entity based on the set of control actions determined by the selected second level controller.

Some embodiments are based on the understanding that an entity is allowed to interact with an oracle or a different entity or agent, receive feedback, and utilize this information for navigation. However, oracle instructions from existing approaches are limited to ground truth actions and direct mapping of specific number of actions to consecutive phrases. In certain cases, a fixed set of natural language instructions may be used as the oracle feedback. In such cases, such natural language instructions may be coupled with target image (or goal image) that the entity will face or see after completion of the task. However, the entity may be required to reach a specific location to query, which is impractical from a human oracle perspective. Therefore, it is an objective of the present disclosure to enable the entity to receive freeform natural language instructions as feedback. The feedback may be obtained from any navigable point in the environment. In this way, the entity may receive input or feedback naturally and flexibly.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5A shows a flowchart of an example method for controlling the entity using a controller, in accordance with an embodiment;

FIG. 5B shows a flowchart of an example method for updating the hierarchical multimodal RL neural network, in accordance with an embodiment;

FIG. 6A shows a flowchart of an example method for performing a sub-task using a first policy, in accordance with an embodiment;

FIG. 6B shows a flowchart of an example method for performing a sub-task using a second policy, in accordance with an embodiment;

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

It is an object of some embodiments to disclose an audio-visual-language (AVL) embodied navigation techniques that allows localization of an audio source in a realistic visual world. It is another object of some embodiments to disclose an AVL embodied navigation method where an audio source is localized in a realistic visual world. It is another object of some embodiments to disclose a new type of hierarchical multimodal reinforcement learning (RL) neural network framework that jointly learns policies for an entity to decide when to query the oracle, how to navigate using audio-goal, and how to use the provided natural language instructions. For clarity purposes only, some embodiments are described in relation to a search operation. However, principles explained in relation to the search operation with sporadic audio source are used by alternative embodiments in other entity navigation applications.

Figure 1A:
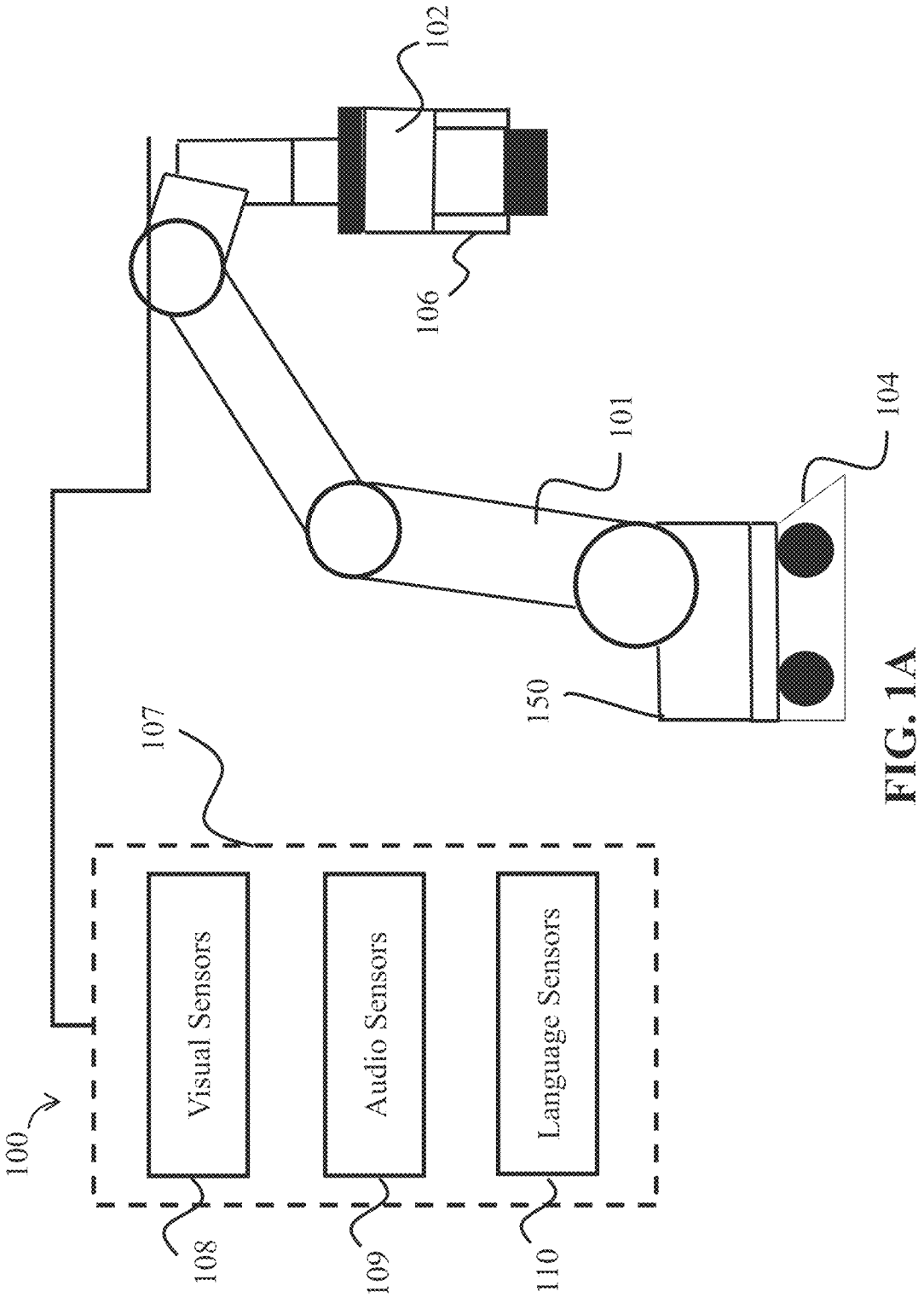
FIG. 1A shows an entity configuration of an entity, according to some embodiments.

FIG. 1A shows an entity configuration 100 of an entity 150, according to some embodiments. The entity 150 includes a locomotion device 101 for providing locomotion in the entity 150. In an example, the locomotion device 101 may include one or more motors to provide locomotion. For example, the one or more motors may include, but is not limited to, an electric motor, a hydraulic motor, and a pneumatic motor. The locomotion device 101 may provide power for movement or locomotion of arms 102, as well as feet 104 of the entity 150. For example, the arms 102 and the feet 104 may have multiple degrees of freedom for moving an object or the entity 150. In some implementations, the arms 102 are provided with an end-tool 106 for holding an object and/or for performing any other robotic operation, such as a search operation. The end-tool 106, for example, may be a gripper. Hereinafter, the 'end-tool' and 'gripper' may be used interchangeably.

According to an embodiment, an objective of the search operation is to determine an audio source, for example, while navigating a rubble to look for and search out trapped humans. For example, the rubble may be caused due to an earthquake. The entity 150 may use audio-visual cues to navigate through the rubble, as well as listens to an audio source or calls for help from trapped victims in natural language to navigate through the rubble. Such audio source may be sporadic or non-repetitive.

To this end, the representation of the entity 150 should not be construed as a limitation. In other embodiments of the present disclosure, the entity 150 may include other components, such as a body, one or more controllers, one or more sensors, end effectors, feedback devices, manipulators, and so forth.

Figure 1B:
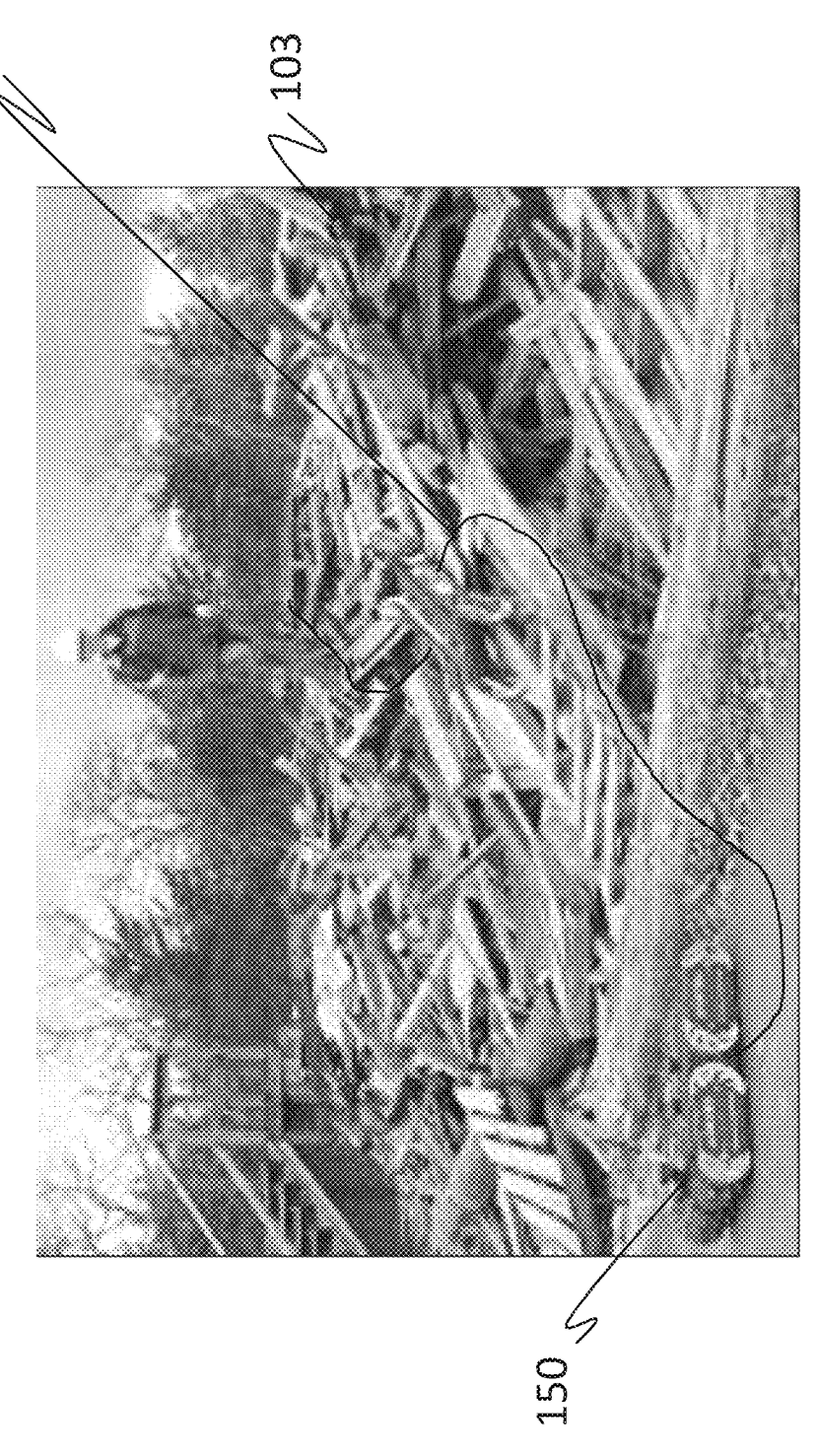
FIG. 1B shows an exemplary search operation, according to an embodiment.

FIG. 1B shows an exemplary search operation performed by the entity, according to an embodiment. FIG. 1B is explained in conjunction with the entity 150 as shown in FIG. 1A. The entity 150 is configured to perform the search operation, e.g., navigate through a rubble 103 to find any trapped victim, for example, based on an audio source, to rescue them. As used herein, the audio source corresponds to a source emitting a sound. For example, the audio source may be a victim trapped in the rubble 103. In a simple scenario, the audio source may be continuous or repetitive, i.e., the victim may continue to emit an audio sound, such as call for help. However, in certain cases, the audio source may be sporadic or non-repetitive, i.e., the victim may only emit an audio sound, such as call for help once. As the locomotion device 101 of the entity 150 includes multiple degrees of freedom, a movement of the entity 150 may comprise a motion profile spanning in a multi-dimensional space.

The entity 150 may be initially at an initial location and is movable, in a start pose 111. A location of the entity 150 corresponding to the initial location is referred to as an initial state of the entity 150. According to an embodiment, aim of the search operation is to identify one or more victims trapped inside of the rubble 103, wherein the one or more victims may or may not produce an audio sound. For example, the entity 150 is configured to move the arms 102 and the feet 104 along a trajectory 113 to navigate through the rubble 103.

A goal of the entity 150 is determined based on a location of an audio source, such as a call from a trapped victim. At the end of a successful execution of the search operation, a state of the entity 150 is considered to have attained a goal state of the entity 150. Therefore, achieving the goal state of the entity 150 is equivalent to successful execution of the search operation. According to an embodiment, the trajectory 113 is defined according to a start state and the goal state of the entity 150. Further, such search operation may be executed repeatedly by the entity 150.

Considering the present embodiment, the entity 150 may need to navigate the never-seen-before rubble 103 (e.g., after an earthquake) to look for and search out trapped humans. The entity 150 may need to use visual cues to navigate the rubble 103. Moreover, the entity 150 may also needs to listen to ailing sounds or the calls-for-help from the trapped victims. The entity 150 may further have to communicate and update a control station on the victims it found to guide rescue efforts. In certain cases, the entity 150 may also seek help from other agents or human operators for locating the victims when it cannot visually/auditorily-locate the source of sounds. Therefore, some embodiments of the disclosure are based on a recognition that the entity 150 needs embodied autonomy as well as the capability for multimodal interaction. In an aspect, embodiments of the present disclosure seek to address a problem relating to multitude of semantic levels for information relating to different modalities, due to which the entity 150 needs to know what information it needs to seek at which time for efficiently solving its mission. For example, if a sound is not clearly audible, the entity 150 may seek assistance from a remote operator for suggestions on where or which direction to focus the search in. However, the provided operator instructions could be in natural language, and thus the entity 150 needs to clearly decipher it to make navigation commands out of these instructions. Subsequently, for deciphering the natural language instructions, a task may have to be performed that involves reasoning at a higher semantic level.

Some embodiments are based on a recognition that the goal state of the entity 150 involved in the search operation may vary between the repetitions of the search operation. For example, in case the entity 150 listens or senses a sound from an audio source, such as from a victim, the entity 150 may begin the search operation to identify the audio source and identify the victim. For example, the audio sound may be in natural language, sporadic and non-repetitive.

Some embodiments are based on a recognition that the entity 150 may generate the trajectory 113 in parts to navigate through the rubble 103. For example, the entity 150 may break down the task of navigating through the rubble 103 to find the victim into one or more sub-tasks. In this regard, completion of a first sub-task from the one or more sub-tasks may correspond to generation or a first part of the trajectory 113 and navigation of the entity 150 on the first part. Once the first sub-task is performed, the entity 150 may perform a second sub-task to generate a second part of the trajectory 113.

To that end, referring back to FIG. 1A, the entity 150 may generate the trajectory 113 (shown in FIG. 1B), specifically, the parts of the trajectory, based on sensor data received from one or more sensors 107. In an example, the entity 150 may include one or more visual sensors 108, one or more audio sensors 109, and one or more natural language sensors 110. For example, the visual sensor 108 may be a camera, and the audio sensor 109 may be a microphone. For example, the entity 150 may perceive visual and audible information around it to formulate the first sub-task. However, in certain cases, the entity 150 may fail to navigate through the rubble 103 based only on sensor data corresponding to goal estimate, i.e., sensor data relating to environment of the entity 150. Subsequently, the entity 150 may require input in another modality, such as a natural language audio or visual input, to formulate other sub-tasks and generate the trajectory 113 completely.

To this end, some embodiments are based on a recognition that the entity 150 may not know when to query an oracle in an environment, such as the rubble 103, to receive natural language input. Some embodiments are also based on a recognition that the entity 150 may not know how to navigate through the rubble 103 based on the audio sensors 109 and visual sensors 108. Some embodiments are also based on a recognition that the entity 150 may not know how to use natural language instructions, i.e., natural language modality, along with other sensor based instructions, i.e., audio, and visual modalities.

Figure 1C:
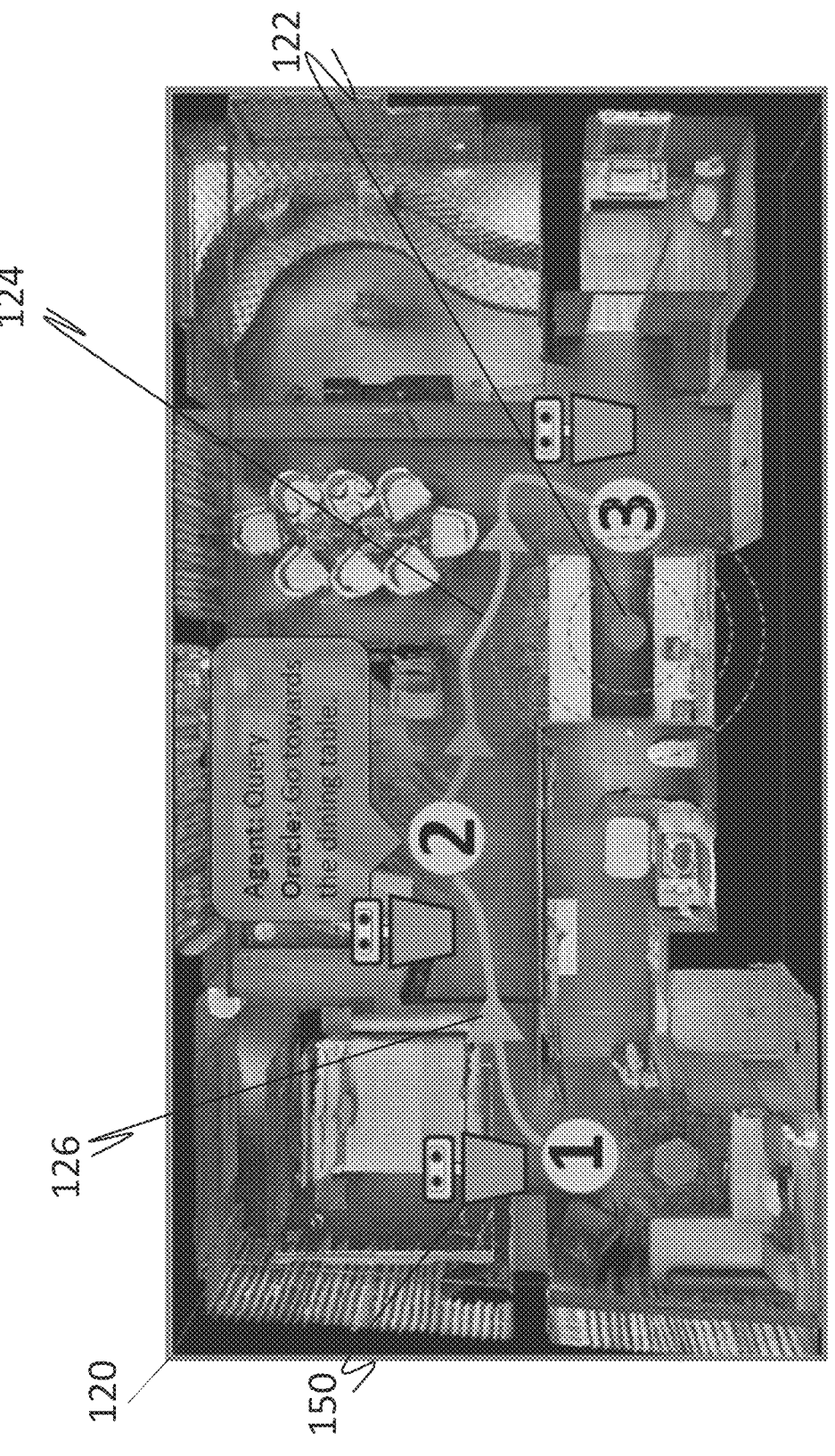
FIG. 1C shows an exemplary search operation, according to another embodiment.

FIG. 1C shows an exemplary search operation performed by the entity 150 based on different modalities, according to an embodiment. FIG. 1B is explained in conjunction with the entity 150 as shown in FIG. 1A. The entity 150 is required to navigate in an unseen 3D room environment 120 to find a semantic sounding object 122. It may be noted that the sound emitted by the semantic sounding object 122 may be sporadic or short of duration.

In an example, a task to be performed by the entity 150 may be specified by $(O_0, g)$, where $O_0$ is the initial observation and g is a feature descriptor of a goal to reach (such as a neural encoding of sound heard by the entity 150). The goal may correspond to the location of the semantic sounding object 122. A densely sampled grid of N location of 1 m resolution may be used as a navigation graph for navigation of the entity 150. As described above, the entity 150 is equipped with visual sensors 108, such as camera, and audio sensors 109, such as microphone, to perceive visual and audible information around it. In one example, the task may be formulated as a partially observable Markov decision process (POMDP) (S, A, O, T (s'|s, a), R (s, a), P (o|s)), where S, A, O are state, action space, and observation, respectively. Further, T (s'|s, a) denotes transition probabilities, P (o|s) refers to observation probabilities, and R (s, a) corresponds to a reward function. The action space is given by:

$$A = \{\text{stop, move forward, turn right, turn left}\}.$$

In certain cases, the entity 150 may interact with an oracle during its navigation under a budget. For example, the budget may specify a limit on a maximum number of interactions allowed between the entity 150 and one or more oracle in the environment 120. After an interaction between the entity 150 and the oracle, the entity 150 receives natural language instruction from the oracle. In an example, the instruction includes a path segment along a shortest path trajectory for the entity 150 to navigate towards the goal, i.e., the semantic sounding object 122. In an example, the natural language instruction provided by the oracle is, for example, 'go around the sofa and take a left'. Although the natural language instruction may be a single instruction, however, a ground truth trajectory 124 would be a series of instructions such as 'move forward', 'move forward', 'turn right', 'turn right', 'turn left'. For example, a ground truth trajectory 126 may be a short segment extracted from the ground truth trajectory 124 that goes from a current location, depicted as number '1' and pose of the entity 150, such as an initial state, towards the goal, depicted as number '3', via an intermediate location depicted as number '2'. At any point in the navigation process, the entity 150 may utilize either audio-based navigation $(o_t, g)$ or language-based navigation $(o_t, g, X_t)$ to find an action distribution in the action space. Here, $o_t$ is the observation at time step t and $X_t$ is the natural language feedback received from the oracle.

Some embodiments are based on a recognition that a policy is required for the entity 150 such that the policy maximizes an expected return $E_\tau[\Sigma_t R (s_t, a_t)]$ over all trajectories $\tau$ while minimizing negative reward for asking the oracle for feedback. Some embodiments are based on a recognition that a notation for the reward function is to be included in the entity 150.

At any step in the trajectory 124, the entity 150 receives a partial observation of the environment 120 (i.e. visual modality) and an audio waveform (i.e. audio modality). Both the modalities, i.e., visual and audio, need to be encoded to be used in inference pipeline. At time step t, the observation of the entity 150 consists of $(I_t, B_t, p_t, a_{t-1})$ where $I_t$ is an egocentric visual observation consisting of an RGB and a depth image, $B_t$ is a binaural audio waveform represented as a two channel spectrogram, $p_t$ is pose of the entity 150, and $a_{t-1}$ is previous action taken by the entity 150. In an example, separate encoders may be used for visual and audio observations. For example, a memory module M is used to store history information in an embedded form. The memory module M stores observation embedding of each step separately. Initially, the memory module M starts from an empty set. At a time step t, the memory module M stores, $$M = \{e_i^O : i = \max\{0, t - s_M\}, \ldots, t\},$$

where $s_M$ is memory size and $$e_i^O$$

is observation encoding. In an example, a goal estimation network is a convolutional neural network (CNN) $f_D$ and the estimate $\hat{g}_t=f_D(B_t)$ is the stepwise estimate of the sounding goal. The estimate may include two parts: (i) the goal location, and (ii) the goal category. Some embodiments are based on a recognition that the entity 150 aggregates a current goal estimate with a previous goal estimate as $g_t=(1-\lambda) \hat{g}_t+\lambda f_p(g_{t-1}, \Delta p_t)$. When the sound is turned off, $\lambda=1$, which means the current goal estimate would be the update of the previous goal estimate. It may be noted that the term "goal estimate" is used interchangeably as "goal descriptor".

Some embodiments are based on a recognition that communication among humans is conveyed closely with different modalities of information (such as visual information and audio information) about surrounding objects and events. For machines, such as the entity 150, to converse with the oracle, such as a human, about the search operation, multi-modal reasoning is required. The multi-modal reasoning is utilized to generate effective models of dynamic audio-visual scenes. The entity 150 may infer about the search operation based on the modals and generate responses to query from the oracle. In an example, such multi-modal query may be formalized through audio visual scene aware dialog (AVSD) system. Some applications of the AVSD system include end-to-end dialogs, visual question answering (VQA), and video captioning. The AVSD system may be used for supporting conversations between the oracle and the entity 150. To support the conversations, the AVSD system requires ability to model audio-visual scenes and previous dialog context using multi-modalities (such as audio, video, query, and multi-turn dialog history) jointly, and to generate responses in free-form natural language. To this end, computational resources may be required to model queries in natural language. For example, the entity 150 may have a set budget, and therefore, the entity 150 may require a policy to decide when to query the oracle based on the budget. Moreover, the modalities like natural language and video (or audio) information are required for the AVSD task. The video may be independent of the natural language and sometimes the natural language information and the audio information may contain similar information. Some embodiments are based on a recognition that the entity 150 needs to extract relevant information from the natural language to use the information from the natural language.

Figure 2:
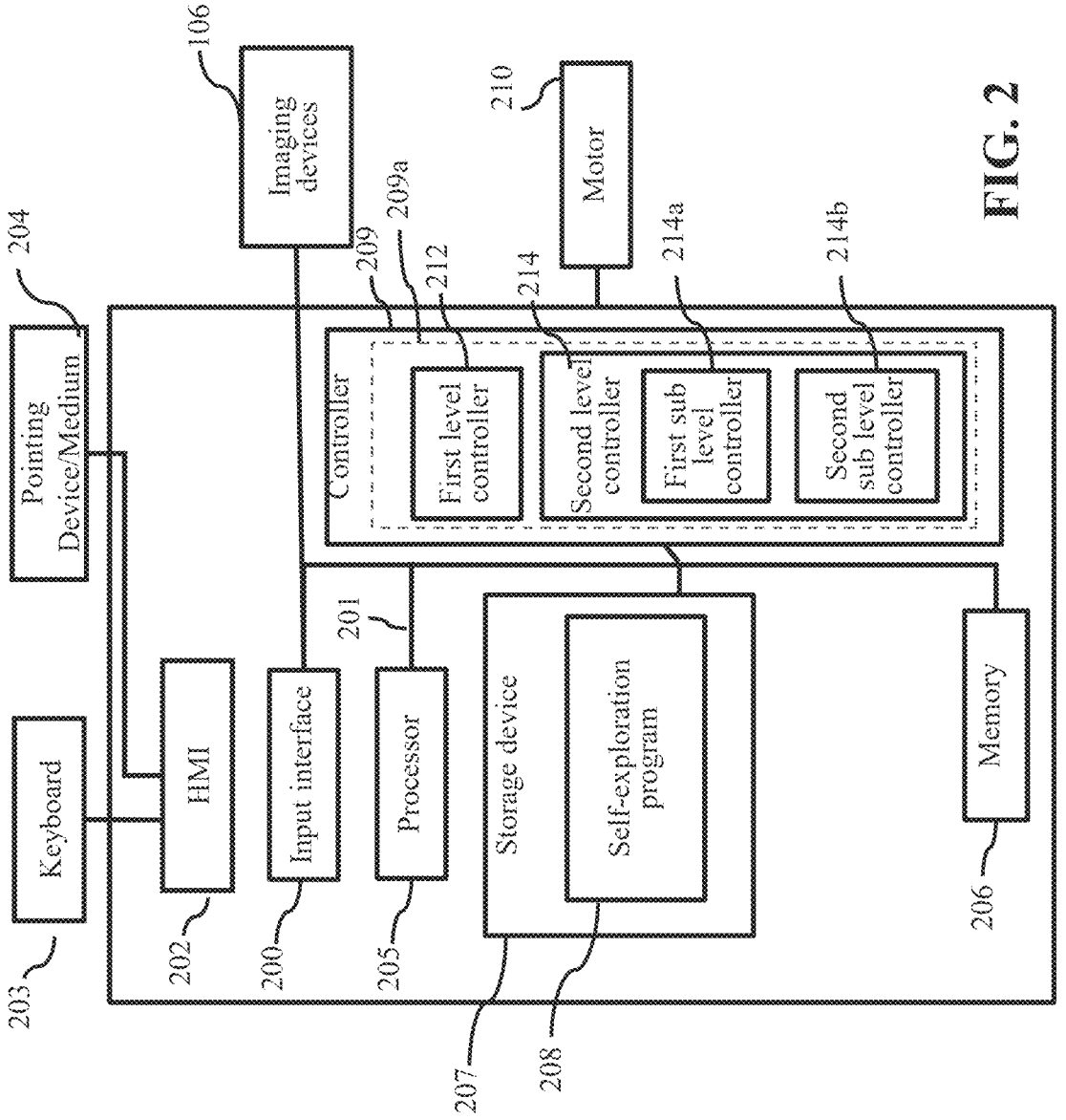
FIG. 2 shows a block diagram of the entity for performing a search operation, according to some embodiments.

FIG. 2 shows a block diagram of the entity 150 for performing an AVSD task, such as a search operation, according to some embodiments. The entity 150 includes an input interface 200 configured to receive input data indicative for the motion of the entity 150. The input data may be used to transition a pose of the entity 150 from a start pose to a goal pose to perform the task. The input interface 200 may be further configured to accept an end-pose modification. The end-pose modification includes at least one or combination of a new start pose of the entity 150 and a new goal pose of the entity 150. In some embodiments, the input interface 200 is configured to receive input data indicative of visual and audio signals experienced by the entity 150 during the performance of the task. For example, the input data corresponds to multi-modal information, such as audio, video, textual, natural language, or the like. Such input data may include sensor-based video information received or sensed by the visual sensors 108, sensor-based audio information received or sensed by the audio sensors 109 and, or a natural language instruction received or sensed by the language sensors 110. The input data may be raw measurements received from the sensors 107 or any derivative of the measurements, representing the audio and/or video information and signals.

In one embodiment, the entity 150 is a set of components, such as the arms 102, the feet 104, and the end-tool 106, linked by joints. In an example, the joints may be revolutionary joints, sliding joints, or other types of joints. The collection of joints determines the degrees of freedom for the corresponding component. In an example, the arms 102 may have five to six joints allowing for five to six degrees of freedom. In an example, the end-tool 106 may be a parallel-jaw gripper. For example, the parallel jaw gripper has two parallel fingers whose distance can be adjusted relative to one another. Many other end-tools may be used instead, for example, an end-tool having a welding tip. The joints may be adjusted to achieve desired configurations for the components. A desired configuration may relate to a desired position in Euclidean space, or desired values in joint space. The joints may also be commanded in the temporal domain to achieve a desired (angular) velocity and/or an (angular) acceleration. The joints may have embedded sensors, which may report a corresponding state of the joint. The reported state may be, for example, a value of an angle, a value of current, a value of velocity, a value of torque, a value of acceleration, or any combination thereof. The reported collection of joint states is referred to as the state.

The entity 150 may have a number of interfaces connecting the entity 150 with other systems and devices. For example, the entity 150 is connected, through a bus 201, to the sensors 107 (shown in FIG. 1A) to receive the new start pose and the goal pose via the input interface 200. Additionally or alternatively, in some implementations, the entity 150 includes a human machine interface 202 that connects a processor 205 to a keyboard 203 and pointing device 204, wherein the pointing device 204 may include a mouse, trackball, touchpad, joystick, pointing stick, stylus, or touchscreen, among others. In some embodiments, the entity 150 may include a motor 210 or a plurality of motors configured to move the joints to change a motion of the arms 102 and/or the feet 104 according to a command produced according to a control law or a policy. Additionally, the entity 150 includes a controller 209. The controller 209 is configured to operate the motor 210 to change the placement of the arms 102 and/or feet 104 according to the policy. The commands for the entity 150 are received from the controller 209 via the bus 201. For example, the state is received by the controller 209 via the bus 201, from the sensors 107. In an example, the bus 201 is a dedicated data cable. In another example, the bus 201 is an Ethernet cable. For example, the entity 150 may have to search for the semantic sounding object 122 shown in FIG. 1C. For example, instructions to navigate and reach the semantic sounding object 122 may be part of a task description.

In accordance with present example, the controller 209 includes a hierarchical multimodal reinforcement learning (RL) neural network 209a, which further includes a first level controller 212 and at least two second level controllers 214. For example, the at least two second level controllers 214 includes a first sub level controller 214a and a second sub level controller 214b. For example, the first level controller 212 may select one of the two second level controllers 214, i.e., one of the first sub level controller 214a and the second sub level controller 214b to perform a navigation sub task. A manner in which the first level controller 212 selects one of the first sub level controller 214a and the second sub level controller 214b is described in detail in conjunction with the following figures.

The first level controller 212 uses a learned policy having a reinforcement learning network to determine when to select one of the at least two second level controllers—the first sub level controller 214a and the second sub level controller 214b. In one example, the learned policy represents a directive for the entity 150 to decide what action it should take. The learned policy may be a sequence of actions or states for the entity 150. A more complicated policy is represented by a function, which takes as input a robot state, and provides the robot with an action to take. An action may represent values that should be applied to joints and parts in order to move the entity 150 from one place to another. For example, the learned policy may be deterministic, meaning that the policy provides a single value for each movement of one or more parts of the entity 150. The learned policy can also be stochastic, and the policy provides a probability distribution over values for the movement. In an embodiment, the learned policy takes as input a state and is represented by a neural network, such as a reinforcement learning network. In another embodiment, the policy may be represented by an analytical function, which takes as input a state. A policy may be executed for a sequential number of time steps, which means that for a state at some initial time step $t_0$, the policy provides the entity 150 with an action, which is then executed by the entity 150. The entity 150 will then have arrived in a new state at time step $t_1$. The policy is then executed with that new state at time step $t_1$. This repeats for a desired number of time steps, or the entity 150 receives an indication that the sub-task (such as the search operation) has been completed. This repeated execution of a policy will result in a trajectory.

In an embodiment, the second level controllers 214 may be configured with different modalities. For example, the first sub level controller 214a may relate to a first modality and the second sub level controller 214b may relate to a second modality. In an example, the first modality relating to the first sub level controller 214a is an audio or video based modality and the second modality relating to the second sub level controller 214b is a natural language-based modality. To this end, the first sub level controller 214a and the second sub level controller 214b may be configured with different policies based on the corresponding modality. Therefore, the first modality is different from the second modality.

It may be noted that references to an entity, without the classifications "physical", "real", or "real-world", may mean a physical entity or a physical robot, or a robot simulator which aims to faithfully simulate the behavior of the physical entity or the physical robot. A robot simulator is a program consisting of a collection of algorithms based on mathematical formulas to simulate a real-world robot's kinematics and dynamics. In the preferred embodiment the robot simulator also simulates the controller 209. The robot simulator may generate data for 2D or 3D visualization of the entity 150.

The entity 150 includes the processor 205 configured to execute stored instructions, as well as a memory 206 that stores instructions that are executable by the processor 205. The processor 205 may be a single core processor, a multi-core processor, a computing cluster, or any number of other configurations.

The memory 206 may include random access memory (RAM), read only memory (ROM), flash memory, or any other suitable memory systems. The processor 205 is connected through the bus 201 to one or more input interfaces and the other devices. In an embodiment, the memory 206 is embodied within the controller 209 and may additionally store the hierarchical multimodal RL neural network 209a. The hierarchical multimodal RL neural network may in turn embody the first controller 212 and the second level controllers 214 in an exemplar implementation.

The entity 150 may also include a storage device 207 adapted to store different modules storing executable instructions for the processor 205. The storage device 207 may also store self-exploration program 208 for producing training data indicative of a space of the environment within which the entity 150 may have to navigate. The storage device 207 may be implemented using a hard drive, an optical drive, a thumb drive, an array of drives, or any combinations thereof. The processor 205 is configured to determine a control law for controlling the plurality of motors to move the arms 102 and/or the feet 104 according to the policy and execute the self-exploration program 208 that explores the environment by controlling the plurality of motors according to the learned policy.

The entity 150 may be configured to perform the task, such as a navigation task for navigation the entity 150 from the initial state of the entity 150 to a target state (such as location of the semantic sounding object 122) by following a trajectory. The trajectory may be broken down into various sub-trajectories, representing various sub-tasks for the entity 150.

Figures 3A, 3B:
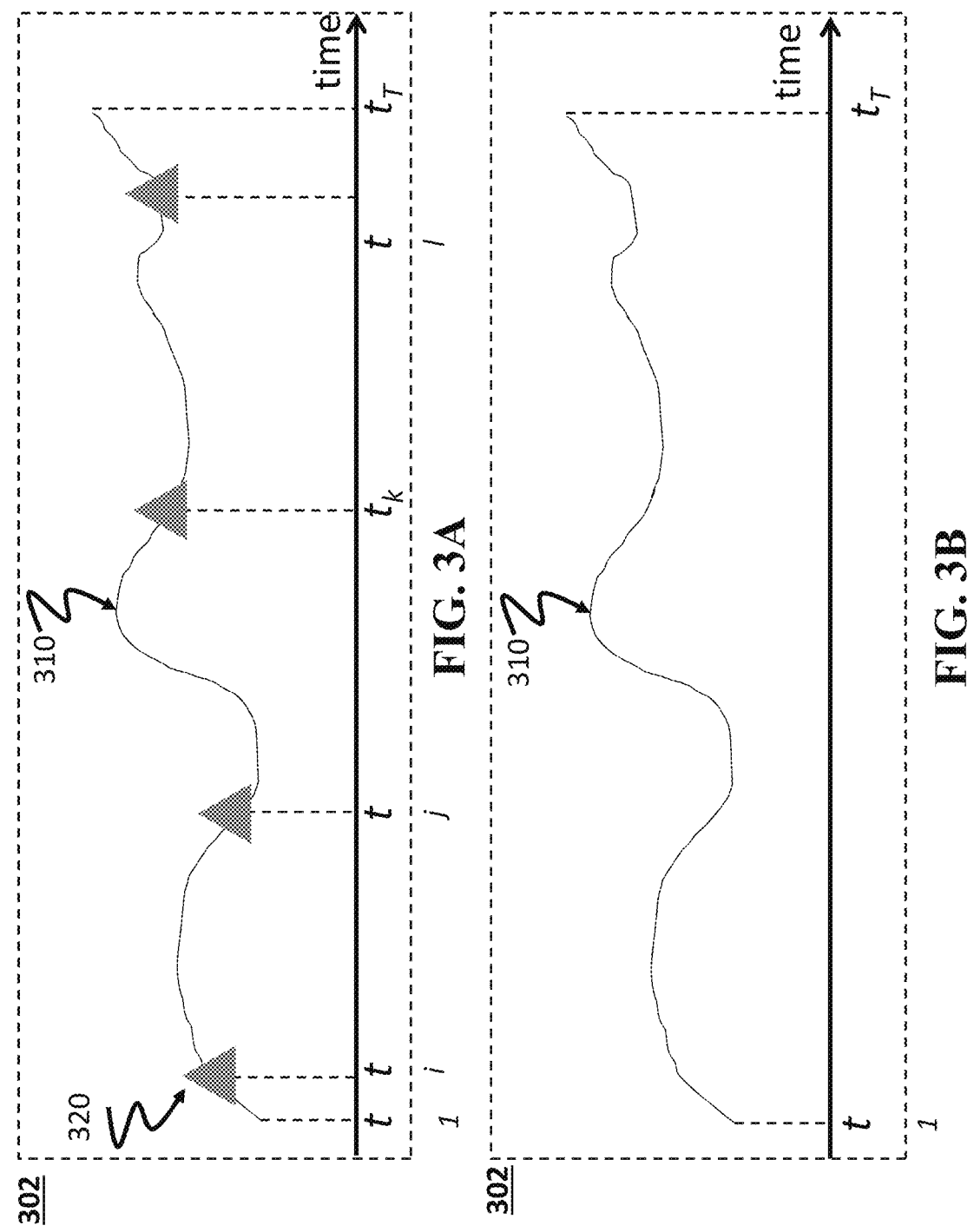
FIG. 3A depicts a trajectory with sub goals, in accordance with an embodiment.
FIG. 3B depicts the trajectory without any sub goals and only consisting of trajectory data points, in accordance with an embodiment.

FIG. 3A depicts such a trajectory 302 (the overall task) with sub goals or sub-tasks, in accordance with an embodiment. The trajectory 302 is associated with a task or subtask that the entity 150 should perform. In this regard, trajectory data points 310 are a sequence of values $a_t$ discrete time steps in some temporal order. For example the values may be the coordinates of 3D locations in Cartesian space. In another example, values may be vectors of joint angles for each of the joints of the entity 150. Other values such as velocities and acceleration may also be used. The trajectory data points 310 may store a state of the entity 150 at each discrete time step. The trajectory 302 is said to have length T, according to some discrete number of timesteps. The start of a trajectory 302 is $a_t$ time step $t_1$, and the end of the trajectory 302 is $a_t$ time step $t_T$. The trajectory data points 310 are depicted as a continuous line, but the line is in fact a collection of discrete points. The continuous line is merely used for the simplicity of drawing. At various time steps along the trajectory 302 are sub goals 320. A sub goal 320 is a particular data trajectory point 310 at some discrete time step t. The sub goal 320 may be stored as a time step value t. Alternatively, the trajectory data points 310 may contain a sub goal index value. For example, given three sub goals, $s_1$, $s_2$ and $s_3$ stored as integer numbers, the trajectory data points 310 may contain the integer number $s_1$, $s_2$ and $s_3$. In the depiction the four sub goals 320 are stored at time steps $t_i$, $t_j$, $t_k$, and $t_l$. The time step locations of the sub goals depend on the task that is associated with the trajectory 302. The sub goals 320 essentially divide the trajectory 302 into a set of sequences of trajectory data points 310. The sequences may have different lengths, determined by the locations of the sub goals 320. For example the sequence between sub goals 320 at time steps $t_i$ and $t_j$, is of length: $t_j$-$t_i$. The trajectory 302 may not have any sub goals 320 at all.

FIG. 3B depicts the trajectory 302 without any sub goals, and only consist of trajectory data points 310, in accordance with an embodiment. The trajectory 302 may be generated by a human operator, a software, a robot controller, or a policy. It is understood that there could be other mechanisms which generate a trajectory 302.

Referring back to FIG. 3A, the sub goals 320 may be stored on the entity 150 as part of a source policy with sub goals and/or target policy with sub goals. In an example, the sub goals 320 are generated by a neural network which takes as input trajectories 302 generated from the learned policy. In an embodiment, the number of sub goals 320 are predetermined by a human operator. In another embodiment, the number of sub goals 320 may be learned by analyzing the trajectory 302 or an audio sound, such as from the semantic sounding object 122. An example of analyzing a trajectory is to determine if the values in the trajectory between two subsequent time steps change more than some threshold, in which case one of the time steps is considered as a sub goal. For example, the sub goals may be set based on input data received by the entity 150. As mentioned above, the input data may be from several modalities, such as audio, video, natural language, and so forth. The entity 150 may receive a new input data upon completing a sub goal. Based on the new input data and the previous sub goal, the entity 150 may determine a next sub goal. In this regard, each of the sub goal may correspond to a segment of a trajectory that the entity 150 may have to navigate to complete a task, such as search operation, for example, to reach the semantic sounding object 122. In order to reach a sub goal, the entity 150 may have to perform a corresponding subtask. In an example, the entity 150 performs one or more subtasks in a hierarchical manner. The hierarchical manner in which the subtasks are performed is described in FIG. 4.

Figure 4:
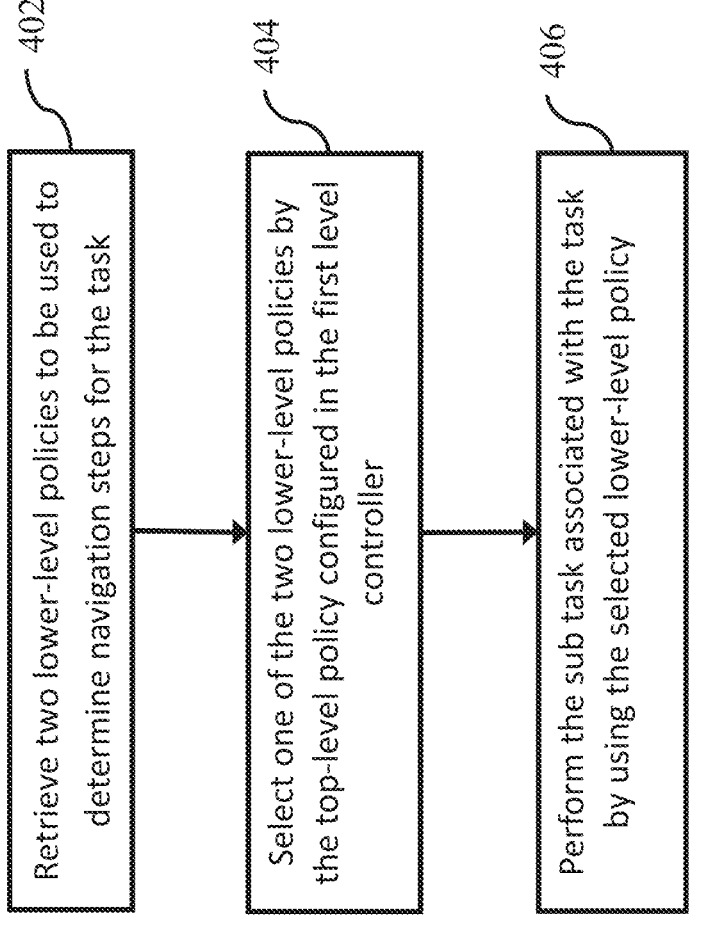
FIG. 4 shows a flowchart of an example method for performing a task using a hierarchical multimodal reinforcement learning (RL) neural network framework, in accordance with an embodiment.

FIG. 4 shows a flowchart of an example method for performing a task using a hierarchical multimodal RL neural network 209a framework, in accordance with an embodiment. In an example, the task is a navigation task for navigation of the entity 150 from an initial state till a target state. For example, with regard to the search environment 120, the initial state may correspond to a starting pose and starting state of the entity 150 and the target state corresponds to a location of the sounding object 122.

It may be noted that the entity 150 is equipped with the ability to interact with an oracle in the environment 120 and receive natural language feedback. The entity 150 is then required to break down the task into multiple subtasks. The entity 150 performs the multiple sub-tasks, e.g., navigate based on a goal estimate or goal descriptor, decide when to query the oracle, and predict a set of sequential control actions if queried based on the instruction. In an example, the entity 150 may utilize the hierarchical multimodal RL neural network 209a to perform the multiple sub-tasks. The method describes use of the hierarchical multimodal RL neural network to train a robot, such as the entity 150, to learn how to perform the task, or a sub-task of the task, in an effective manner.

Reinforcement learning (RL) is an area of machine learning concerned with how software agents, entities or controllers ought to take actions in an environment to maximize some notion of cumulative reward. An RL agent interacts with its environment in discrete time steps. At each time t, the RL agent receives an observation $o_t$, which typically includes a reward $r_t$. RL controller then chooses an action a t from a set of available actions to increase the reward, which is subsequently sent to the environment.

It may be noted that several possibilities may exist towards designing the end-to-end hierarchical multimodal RL neural network 209a framework. For example, one may use a single policy that decides whether to query the oracle or make a navigation step either based on the goal estimate or based on received instruction. However, there is a distinct difference between sub-tasks that need to be solved to complete a main task successfully and efficiently. Solving these diverse sub-tasks using a single state space and single policy would be difficult to achieve and will result in sub-optimal performance. To alleviate the above challenge, the whole navigation task may be decomposed to three simple sub-tasks and use independently abstracted state spaces for each sub-tasks. This division of a high-level task into sub-tasks and then using the RL based neural network to perform the task is the core of the hierarchical multimodal RL neural network 209a described in this disclosure. To that end, the hierarchical manner for solving the navigation task is illustrated in FIG. 4 to decide when to query the oracle and how to make a navigation step either based on the goal estimate or based on the received instruction from the oracle.

At 402, two lower level policies are retrieved to be used to determine navigation steps for the task. In an example, the two policies include a first policy and a second policy. For example, the first policy may relate to a first modality and the second policy may relate to a second modality. In an example, the first policy may be configured on the first sub level controller 214a and the second policy may be configured on the second sub level controller 214b.

In an example, the first policy may relate to an audio modality, a video modality, a text modality, other goal-information based modality, or a natural-language-based modality. Similarly, the second policy may relate to an audio modality, a video modality, a text modality, other goal-information based modality, or a natural-language-based modality. According to an example implementation of the embodiments of the present disclosure, the first policy may be an audio based policy and the second policy may be a vision-and-language based policy. In this regard, the first sub level controller 214a configured with the first policy may be configured to perform tasks relating to audio goal policies, i.e., based on audio sensor based input data. Moreover, the second sub level controller 214b configured with the second policy may be configured to perform tasks relating to vision-and-language policies, i.e., based on visual or natural language based input data. It may be noted that such an example of the first policy being the audio-goal policy and the second policy being vision-and-language policy is only exemplary and should not be construed as a limitation. Thus, retrieving any of the two lower level policies is equivalent to the controller 209 using the first level controller 212 to select one of the two second level controllers 214.

Continuing further with the present example, the first policy, i.e., the audio-goal policy, $\pi_{goal}$, and the second policy, i.e., the vision-and-language policy, $\pi_{vln}$ are employed by the independent controllers, i.e., the first sub level controller 214a and the second sub level controller 214b. The first policy and the second policy may correspond to navigation policies. The audio-goal policy, $\pi_{goal}$ ($a_t|o_t$, g) denotes the audio or video based navigation policy that utilizes audio or video sensor data corresponding to the goal estimate and the current state of the entity 150, and $\pi_{vln}$ ($a_t|o_t$, g, X) is the policy to utilize the natural language instruction for navigation. Note that both these policies compute a distribution over an action space A.

However, the entity 150 faces a challenge to decide when to use which policy, i.e., which sub-controller.

At 404, a top-level policy, $\pi_{query}$, configured in the first level controller 212 acts as a gating policy for selecting one of the two lower-level policies, i.e., the first policy $\pi_{goal}$ and the second policy $\pi_{vln}$. In this regard, the first controller 212 uses the learned top-level policy, $\pi_{query}$. For example, the first level controller 212 may select one of the two lower-level policies for performing a sub-task associated with the task. These lower-level policies are also referred to as option policies, or the workers.

In an example, the top-level policy $$\pi_{query}(a'_t \mid o_t, g)$$

computes a distribution over the selection of the first policy $\pi_{goal}$ and the second policy $\pi_{vln}$. Based on the selection of one of the first policy $\pi_{goal}$ and the second policy $\pi_{vln}$, a corresponding sub level controller from the first sub level controller 214a and the second sub level controller 214b may be selected. The top-level policy $\pi_{query}$ may have a reinforcement learning network to determine when to select one of the two second level controllers or the two lower-level policies.

In an example, the first level controller 212 may compute the distribution to select the lower-level policy based on a belief state and goal information. In this manner, the first level controller 212 decides when to query the oracle. Note that by using such a two-stage policy, the top-level policy $\pi_{query}$ learns to implicitly combine the uncertainty in the audio-visual cues and the learned uncertainty of reaching the goal state via choosing the $\pi_{vln}$ or the $\pi_{goal}$ options towards deciding when the entity 150 should make a query and how fruitful that query will be.

At 406, the selected lower-level policy performs the sub task associated with the task. In this regard, selected lower-level policy may obtain input data and a state of the hierarchical multimodal RL neural network 209a. For example, the input data may include sensor measurements or signals captured from the search environment 120, such as audio signal, video signal, or vision-based natural language instruction, audio-based natural language instruction, and so forth. Herein, at least one of: the input data or the state of the hierarchical multimodal RL neural network 209a, as used by the first sub level controller 214a relating to the first modality and the second sub level controller 214b relating to the second modality, are different. In other words, the first sub level controller 214a relating to the first modality may obtain a type of input data, for example, audio signals, and a first set of parameters of the state of the hierarchical multimodal RL neural network 209a that is different from a type of input data, for example, natural language instructions, and a second set of parameters of the state of the hierarchical multimodal RL neural network 209a.

To perform the sub task, the selected lower-level policy configured in corresponding sub level controller may generate a set of control instructions for navigation of the entity 150 from a starting state to a new state. The starting state may correspond to the initial state or a goal state from a previous sub task. Similarly, the new state may correspond to an intermittent state between the initial state and a goal state or the goal state itself. It may be noted that the task may be considered to be completed at the goal state.

In an example, the first sub level controller 214a may relate to a video based modality. In such a case, the first sub level controller 214a, when selected, is configured to determine the set of control actions based on video information. Further, the second sub level controller 214b may relate to an audio based modality. In such a case, the second sub level controller 214b, when selected, is configured to determine the set of control actions based on audio information. Based on the set of control actions, the first sub level controller 214a or the second sub level controller 214b controls the navigation of the entity 150. In another example, the first modality relating to the first sub level controller 214a is an audio or video based modality and the second modality relating to the second sub level controller 214b is a natural language-based modality. In such a case, when the first level controller 212 selects the first sub level controller 214a, the first sub level controller 214a controls navigation of the entity 150 based on sensor-based audio or video information. Alternatively, when the first level controller 212 selects the second sub level controller 214b, the second sub level controller 214b causes the entity 150 to query for natural language embodied navigation instructions. The second sub level controller 214b controls navigation of the entity 150 based on the natural language instructions.

FIG. 5A shows a flowchart of an example method for controlling the entity 150 using a controller, in accordance with an embodiment. In an example, the entity 150 may be a robot having a plurality of parts connected to each other through one or more joints. For example, the entity 150 may have feet, arms, a body, a head, or any other part. Further, the entity may have software agent installed thereon. The software agent may run on one or more controller 209 of the entity 150 to carry out tasks assigned to the entity 150. In one example, a goal description may be based on an audio sound from an audio source. In this regard, the goal may be to perform a search operation for the audio source. Subsequently, the goal may include navigation of the entity 150 to the audio source to complete the search operation.

The method discloses a multi-modal hierarchical RL neural network 209a framework to perform the multiple sub-tasks and control the controller 209. The controller 209 may include the first level controller 212 and second level controllers 214. The second level controllers 214 include the first sub level controller 214a and the second sub level controller 214b. For example, the first sub level controller 214a may relate to a first modality and the second sub level controller 214b may relate to a second modality. In this regard, the first modality may be different from the second modality. Subsequently, a first policy relating to the first modality may be different from a second policy relating to the second modality. In an example, the first modality relating to the first sub level controller 214a is an audio or video based modality, for example an audio modality for reaching the goal estimate, or a video modality for reaching the goal estimate; and the second modality relating to the second sub level controller 214b is a natural language-based modality. It may be noted that the number of second level controllers 214 to be two is only exemplary and in other embodiments of the present disclosure, any number of second level controllers may exist. For example, the number of second level controllers may be based on a number of modalities that can be interpreted by the entity 150. Subsequently, in another example embodiment, three second level controllers may be present corresponding to audio-based modality, video based modality and vision-and-language modality.

Continuing with the present embodiment, the present disclosure discloses multimodal interaction between the entity 150 and the search environment having an oracle. In one example, the oracle may be a human. To this end, the entity 150 may be configured to interact with the environment to obtain goal based measurements, such as sensor readings, or interact with the oracle in the environment using natural language. Based on the interaction, a natural language instruction or sensor measurements may be obtained.

As may be understood, multimodal interaction refers to the interaction with the virtual and physical environment through natural modes of communication. In other words, multimodal interaction enables more free and natural communication, interfacing users with automated systems in both input and output. Specifically, multimodal systems may offer a flexible, efficient and usable environment allowing users, such as the oracle, to interact through input modalities, such as speech, handwriting, hand gesture. In certain cases, when the oracle may not be present in the environment 120, other goal-based sensor data may be acquired from the environment. Then a multimodal system, i.e., the entity 150 has to recognize the inputs from the different modalities and combine them according to temporal and contextual constraints in order to allow their interpretation. The input is processed and interpreted by the entity 150 to perform the search operation or any other navigation task. In accordance with the present disclosure, the neural network 209a is trained based on reinforcement learning.

As may be understood, different modalities inhabit distinct levels of semantic granularity. Specifically, for the entity 150 to navigate or perform a task, it needs to have commands provided to its actuators. However, these commands could be either produced by mapping its sensor inputs directly, or it could be from a spoken natural language instruction that needs to be translated to navigation commands. In a case where input data includes a natural language instruction, one language instruction could correspond to several navigation control commands. Such semantic levels bring in several challenges such as, if there is a budget on a number of queries the entity 150 can ask the oracle, what is a good criterion for the entity 150 to decide when to invoke the natural language query, what would be a good way to synchronize between the modalities so that they offer a cooperative policy to guide the robot to improve its navigation when the inputs (language, and sensors) are at different semantic levels, and how to update the memory or beliefs of the entity 150 at run time in a partially-observable setting. As may be understood, distinct modalities may lead to different navigation paths with varied length of trajectories (e.g., audio-visual navigation might be one-step navigation, while the natural language instructions may lead the entity 150 to make multi-steps with one query/instruction).

An object of the present disclosure is to address the above-mentioned problems. In this regard, the hierarchical multimodal RL neural network 209a is implemented by the first level controller 212 to guide the entity 150 for performing a task associated with an operation, such as the search operation.

At 502, the first level controller 212 selects one of the second level controllers 214 to perform a first sub task relating to the task, based at least on input data, and a state of the hierarchical multimodal RL neural network 209a. In an example, the input data may include sensor based observation data obtained from an environment, such as the search environment 120. In another example, the input data may include a natural language instruction from an oracle in the environment. In yet another example, the input data may include any combination of visual sensor data, audio sensor data and natural language instruction. Moreover, the state of the hierarchical multimodal RL neural network 209a may include all of the information necessary to predict the effects of an action on the completion of the task. The state may also determine if it is a goal state, i.e., destination state. To this end, the state may indicate an effect of a previous action on the entity 150 and a comparison between the effect of the previous action and the goal state.

In an example, the different second level controllers 214 may relate to different modalities. Subsequently, the different second level controllers 214 may utilize different equations or parameters for effectuating an action of the entity 150. Moreover, the different second level controllers 214 may different parameters to determine a state of the hierarchical multimodal RL neural network 209a or a change of state of the hierarchical multimodal RL neural network.

At 504, the selected second level controller from the second level controllers 214 is configured to determine a set of control actions to perform the first sub task. The selected second level controller may utilize its corresponding policy to determine the set of control actions. For example, the set of control actions may be provided to actuators of the parts of the entity 150.

In an example, when the selected second level controller is the first sub level controller 214a relating to the first modality, the first sub level controller 214a may determine the set of control actions. For example, the first modality may be audio or video based modality. The first sub level controller 214a may determine the set of control actions based at least on a first set of state variables associated with the state of the hierarchical multimodal RL neural network 209a and the input data. For example, the input data includes at least one of: the sensor-based audio information, or the sensor-based video information. Further, the second modality associated with the second sub level controller 214b may be natural language-based modality. When the selected second level controller is the second sub level controller relating to the second modality, the second first level controller 212 determines the set of control actions based at least on a second set of state variables associated with the state of the hierarchical multimodal RL neural network and the input data. In this case, the input data may include the natural language instruction. In certain cases, one or more second level controller may be selected to process and interpret different types or modalities of input data, such as audio sensor measurements and natural language instructions. To this end, the first set of state variables may be different than the second set of state variables.

At 506, the entity 150 is controlled based on the set of control actions determined by the selected second level controller. Based on the set of control instructions, the entity 150 or parts of the entity 150 may move. For example, by completing the first sub task, the entity 150 may move from a first pose to a second pose, wherein the first pose and the second pose are different from each other and may be apart from each other. Accordingly, the entity may move from a start state to another state.

Now referring to FIG. 5B, there is shown a flowchart of an example method for updating the hierarchical multimodal RL neural network 209a, in accordance with an embodiment. For example, the state of the hierarchical multimodal RL neural network may be updated by the selected second level controller that performs the subtask based on the performing of the first sub task. At 508, the selected second level controller updates the state of the hierarchical multimodal RL neural network 209a based on the execution of the first sub-task. Once the first sub task is completed or performed, the selected second level controller that enables execution of the first sub task may update a set of state variable associated with the state of the hierarchical multimodal RL neural network. In an example, the first sub level controller 214a may update a first set of state variables based on the execution of the first sub-task. Alternatively, the second sub level controller 214b may update a second set of state variables based on the execution of the first sub-task.

In accordance with an embodiment, the selected second level controller may determine a current belief state associated with the hierarchical multimodal RL neural network. Further, the selected second level controller may modify the belief state of the hierarchical multimodal RL neural network 209a based on the updated state of the hierarchical multimodal RL neural network 209a and the execution of the first sub task. In particular, the belief state includes beliefs of the entity 150 about its current state. The belief state may indicate a distribution for different variables, such as location, estimated distance from the goal state, estimated direction of the goal state, and so forth, corresponding to the current state of the hierarchical multimodal RL neural network 209a. In an example, the belief may be stored in a memory associated with the entity 150 or associated with the hierarchical multimodal RL neural network 209a as a neural embedding.

In an example, the first level controller 212 invokes or selects one of the second level controllers 214 for navigation, wherein the selected second level controller relates to a single step policy, i.e., audio or video based modality. In this regard, the selected second level controller may be the first sub level controller 214a having first modality relating to audio-visual based modality. In such a case, the selected second level controller, or the first sub level controller 214a, updates the belief state in the memory for every step, i.e., after performing every sub task, such as the first sub task.

In another example, the first level controller 212 invokes or selects one of the second level controllers 214 for navigation, wherein the selected second level controller relates to a multi-step policy, i.e., natural language based modality. In this regard, the selected second level controller may be the second sub level controller 214b having the second modality relating to natural language based modality. In such a case, the selected second level controller, or the second sub level controller 214b, generates a new belief state based on the execution of the set of control actions associated with the first sub-task. The new belief state relates to the environment where the entity 150 is navigating to perform the search operation. For example, the second sub level controller 214b uses the existing memory and received language instruction to produce the new belief of the environment. To this end, the natural language modality is assumed to be semantically superior modality as compared to the audio or video based modality. The new belief state may then be used to replace the current belief state or belief history. In this regard, the second sub level controller 214b may clear any previous belief state and replace it with the new belief state.

At 510, the first level controller 212 selects one of the second level controllers 214 to perform a second sub task relating to the task, based at least on the input data, previous state of the hierarchical multimodal RL neural network 209a and the updated state of the hierarchical multimodal RL neural network 209a. The second sub task is performed after the first sub task for completing the main task, such as navigating to the semantic sounding object 122. In this regard, the first level controller 212 may obtain new input data from the environment 120. For example, the new input data may indicate change in surroundings of the entity 150 due to the navigation of the entity based on the first sub task. Subsequently, the first level controller 212 may assess the update in the state of the hierarchical multimodal RL neural network 209a based on the new input data, previous state of the hierarchical multimodal RL neural network 209a and the updated state of the hierarchical multimodal RL neural network 209a. For example, the first level controller 212 may check whether the state of the hierarchical multimodal RL neural network 209a indicates that the entity 150 is closer to a goal state or farther from the goal state. Accordingly, the first level controller 212 may identify the second sub task to be performed in order to navigate the entity 150 towards the goal state.

In an example, the first level controller 212 may check whether the state of the hierarchical multimodal RL neural network 209a is closer or farther from the goal state based on, for example, the new input data. For example, the new input data may indicate an intensity of audio sound emitted by the semantic sounding object 122 in the search environment 120 received at the updated pose of the entity 150. In this manner, the first level controller 212 may determine if the entity 150 has moved closer to the goal state or farther from the goal state.

In an example, based on the second sub task and the new input data, the first level controller 212 may select one of the second level controllers 214 to perform the second sub task. In an example, when the first level controller 212 determines that the updated state of the hierarchical multimodal RL neural network 209a indicates that the entity 150 is moving farther from the goal state or the entity 150 is no longer certain about navigation towards the goal state, the first level controller 212 may select the second sub level controller 214b relating to the natural language modality to query an oracle in the environment for navigation of the entity 150 in an effective manner. Alternatively, when the first level controller 212 determines that the updated state of the hierarchical multimodal RL neural network 209a indicates that the entity 150 is moving closer to the goal state, the first level controller 212 may select the first sub level controller 214a relating to the audio or video based modality to generate a set of control actions based on sensor measurements corresponding to new location of the entity 150.

In an example, based on the update of the state of the hierarchical multimodal RL neural network 209a, the first level controller 212 may be rewarded or punished. For example, when the updated state of the hierarchical multimodal RL neural network 209a brings the entity 150 closer to the goal state, the first level controller 212 may be rewarded. However, when the updated state of the hierarchical multimodal RL neural network 209a takes the entity 150 farther from the goal state, the first level controller 212 may be punished. The operation of the two lower level policies configured on the second level controllers 214 are further described in conjunction with FIGS. 6A and 6B.

FIG. 6A shows a flowchart of an example method for performing a sub-task using a first policy, in accordance with an embodiment. As described above, the entity may use the first level controller 212 and the top-level policy, $\pi_{query}$, to select one of the lower level policies to perform a sub task. In this regard, the first controller 212 may select the first sub level controller 214a.

At 602, the first level controller 212 selects the first sub level controller 214a to perform a sub-task using the first modality. For example, the first sub level controller 214a may be configured with the first policy relating to the first modality. In an example, the first modality may relate to video based modality. In another embodiment, the first modality may relate to audio based modality. In yet another example, the first modality may relate to text based modality. To this end, pursuant to examples of the present disclosure, it is assumed that the first modality may relate to modalities that are free of natural language input. For example, input data associated with the first modality may not include natural language information, such as natural-language speech, or video information.

At 604, the first sub level controller 214a is triggered. Subsequently, the first policy is triggered to perform the sub task. In an example, the first policy $\pi_{goal}$ is a transformer model. As may be understood, self-attention may be implemented by transformer model for neural machine translation. To this end, self-attention by the transformer model follows an encoder-decoder structure without relying on the use of recurrence and convolutions. As may be noted, the encoder of the transformer model is to map an input sequence to a sequence of continuous representations, which is then fed into a decoder. Further, the decoder of the transformer model receives output of the encoder together with decoder output at the previous time step to generate an output sequence.

At 606, the trained first policy $\pi_{goal}$ configured in the first sub level controller 214a is retrieved to perform the sub task. The first policy $\pi_{goal}$ may be based on audio or video modality. For example, the first policy $\pi_{goal}$ is trained using Slot Attention for Video (SAVi) technique. In an example, the first policy $\pi_{goal}$ may have a two-stage training, where in a first stage the memory modules are not used. Further, in the second stage, observation encoders are frozen and the first policy $\pi_{goal}$ is trained with both current observation and history information from memory module. The training loss consists of a value-function loss, policy network loss to estimate the actions correctly, and an entropy loss to encourage exploration. In an example, a reward of '+1' is assigned to reduce a geometric distance towards the goal, and a '+10' reward to complete an episode successfully. Additionally, a penalty of '−0.01' is added per time step to encourage efficiency. A goal descriptor network outputs object category level and relative location estimation. Following the SAVi-based training, off-policy category level predictions and on-policy location estimator may be applied for performing the search operation, such as to navigate the environment 120.

At 608, the first policy obtains audio or video based input data relating to the search environment. In this regard, the first policy $\pi_{goal}$ may use self-attention to obtain information from current observation and history information. To this end, the input data may include information relating to the current observation and the history information. The input data is then encoded. In an example, the input data is encoded in encoded memory as: $M_e$=Encoder(M) by the encoder of the transformer model.

At 610, a goal descriptor is input to the decoder of the transformer model. The decoder attends to information from all encoded time steps and generates a current step representation $s_t$. The decoder then uses an actor-critic network to predict the action distribution and value of the current state. For example, the actor-critic network may be modeled using a single linear layer neural network.

In accordance with an example, the goal descriptor (also referred to as the goal estimate) may include a semantic neural embedding of an object class associated with the semantic sounding object 122. For example, the semantic neural embedding may include a neural feature vector from a classifier model that takes as input the sound emitted by the semantic sounding object 122, and produces a class label of an object, i.e., the semantic sounding object 122, producing the sound. For example, a neural network may be pre-trained in a supervised manner to generate the neural feature vector and the semantic neural embedding. In addition, the goal descriptor may also include an estimated heading vector. For example, the estimated heading vector estimates an approximate spatial direction from which the entity 150 is receiving or has received the sound or audio, i.e., an approximate direction of the semantic sounding object 122. In an example, an absolute radial direction associated with the received sound, and sine and cosine of a heading angle associated with the received sound may be used to estimate the heading vector.

At 612, the first sub level controller 214a generates a set of control actions for navigation of the entity 150. In this regard, the first policy employs an action sampler to sample the action from the distribution and generate the set of control actions. Based on the set of control actions, the entity 150 takes a step in the environment, such as the environment 120, and receives a new observation. To this end, the first sub level controller 214a is configured to determine the set of control actions based on at least one of: sensor-based audio information or sensor-based video information.

Referring to FIG. 6B, a flowchart of an example method for performing a sub-task using a second policy is shown, in accordance with an embodiment. In this regard, the entity 150 may use the first level controller 212 and the top-level policy, $\pi_{query}$, to select one of the second sub level controller 214b. The second sub level controller 214b may be configured with the second policy relating to a second modality.

At 620, the first level controller 212 selects the second sub level controller 214b to perform a sub-task using the second modality. For example, the second sub level controller 214b may be configured with the second policy relating to a second modality. In an example, the second modality may correspond to natural language based modality.

At 622, the second sub level controller 214b is triggered. Subsequently, the second policy is triggered to perform the sub task. In an example, the second policy $\pi_{vln}$ also has transformer based framework. As described above, the transformer based framework may implement self-attention and follows an encoder-decoder structure without relying on the use of recurrence and convolutions.

At 624, the trained second policy $\pi_{vln}$ configured in the second sub level controller 214b is retrieved to perform the sub task. The second policy $\pi_{vln}$ may be based on natural language based modality. For example, the language-based navigation policy, i.e., second policy Twin follows a two stage training. In an example, the first stage consists of an off-policy training. In this regard, fine-grained instructions to learn language-based navigation policy $\pi_{vln}$ may be repurposed. Further, the second stage consists of on-policy training. During rollouts in the hierarchical framework of the first level controller 212 having the top-level policy $\pi_{query}$, the entity 150 interacts with the oracle and receives language instructions. The instructions may be used to determine a shortest path trajectory towards the goal to fine-tune the second policy $\pi_{vln}$. both the stages, the second policy $\pi_{vln}$ is trained with an Imitation Learning objective.

At 626, the second policy obtains natural language based input data relating to the search environment. In an example, the natural language based input data may include an instruction X. The input data may also include an initial observation O. Given the instruction X and the initial observation $O_0$, the language based navigation framework, i.e., the second policy, performs a sequence of actions ($a_1$, $a_2$, ..., $a_T$), each $a_t \in A$. In this regard, the second policy $\pi_{vln}$ may use self-attention to capture information from the sequential inputs and encode the belief state. For example, the transformer based framework obtains current observation and memory information as input data for the transformer based framework at any time step of the language based navigation.

At 628, the second policy uses a Contrastive Language-Image Pre-Training (CLIP) model to encode sentence instruction X. The CLIP model comprises a neural network trained on different image and text pairs. The CLIP model includes two sub-models, called encoders, including a text encoder and an image encoder. The text encoder embeds text into a mathematical space while the image encoder embeds images into a mathematical space. For example, using the CLIP model the sentence instruction X may be infused with a current belief state using a simple feed forward network. Then, the fused belief state and language instruction X are processed with another transformer based framework to obtain a final belief of the state, which is then used for computing the action distribution.

At 630, the second sub level controller 214*b* generates a set of control actions for navigation of the entity 150. In this regard, the second policy uses the transformer based framework to execute instruction based navigation. The second policy employs an action sampler to sample the set of control actions from the action distribution and generate the set of control actions. The second sub level controller 214*b* may also interact with the search environment 120 and perceive new observations as it executes the set control actions. The entity 150 may navigate on the ground-truth trajectory by following teacher actions and calculate a cross-entropy loss for each decision in each step by $$-\sum_t a_t^* \log(p_t^a)$$

where a* is a ground truth action and $$p_t^a$$

is the action probability predicted by $\pi_{vln}$. In this manner, the second sub level controller 214*b* is configured to determine the set of control actions based on the natural language instruction X.

Figure 7:
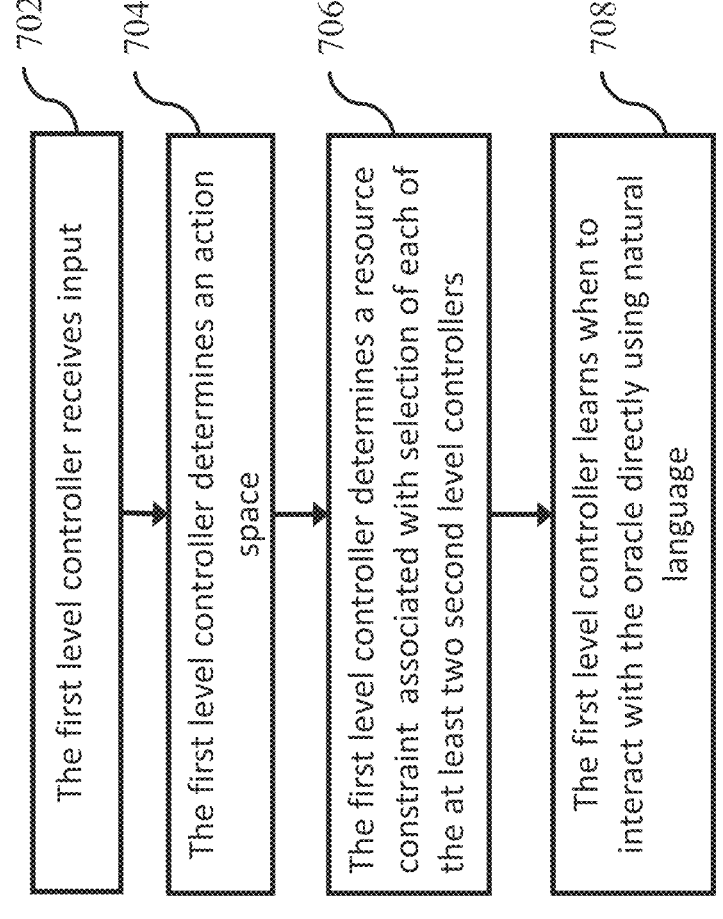
FIG. 7 shows a flowchart of a method for determining when to query an oracle, in accordance with an embodiment.

FIG. 7 shows an illustration of a setup for determining when to query an oracle, in accordance with an embodiment.

As described above, the first level controller 212 having the top-level policy, $\pi_{query}$, decides when to query an oracle, i.e., when to use the second policy, $\pi_{vln}$, of the second sub level controller 214*b* relating to the second modality. However, if the top-level policy, $\pi_{query}$, directly utilizes model uncertainty or heuristics on when to query, the top-level policy, $\pi_{query}$, may predict it wrongly. Therefore, it is an objective of the present disclosure to correctly predict when to select the second policy to query the oracle. In accordance with the present disclosure, a reinforcement learning framework may be used to learn when to query the oracle in an end-to-end manner. A manner in which the first level controller 212 learns when to query the oracle or select the second policy, $\pi_{vln}$, relating to the second modality is described in the FIG. 7.

At 702, the first level controller 212 receives input. The input may include a current observation encoding (or sensor measurements relating to current observations), memory of episodes or states collected so far and a goal descriptor of the goal state.

At 704, the first level controller 212 determines an action space. In accordance with an example, two policies may be present configured on the two second level controllers 214. For example, the action space may include two actions, namely, select a first policy, $\pi_{goal}$, and select a second policy, $\pi_{vln}$. As may be noted, the first policy, $\pi_{goal}$, relates to a first modality, wherein the first modality is audio or video based modality. For example, the audio or video based modality may relate to sensor based input data from the search environment, such as audio sensor data, video sensor data, etc. Moreover, the second policy, $\pi_{vln}$, relates to a second modality, wherein the second modality is natural language based modality. For example, the natural language based modality may relate to natural language based input data, such as speech, video, etc. Subsequently, when the top-level policy, $\pi_{query}$, selects the second policy, $\pi_{vln}$, the entity 150 queries for navigation instructions from the oracle and obtains the natural language instruction to navigate the environment. However, when the top-level policy, $\pi_{query}$, selects the first policy, $\pi_{goal}$, the entity 150 navigates on audio or video information obtained by sensors (or the likely direction from which the sound or audio was heard if it is non-audible anymore).

At 706, the first level controller 212 determines a resource constraint associated with selection of each of the at least two second level controllers 214. In particular, the first level controller 212 predicts a reward associated with a selection from the two second level controllers and budget associated with the task. It may be noted that irrespective of which of the first policy or second policy is selected, the entity 150 collects rewards or penalties based on the action taken by the entity 150 to navigate in the environment. Therefore, to accurately determine when to query the oracle, the reinforcement learning framework, i.e., budget, or negative reward associated with the selection of the second level controllers 214 may be determined.

In an example, the resource constraint may comprise a limit indicating a maximum number of many times that a particular second level controller from the two second level controllers 214 may be invoked. Pursuant to present example, the resource constraint includes a limit on the maximum number of times the first level controller 212 of the entity 150 can invoke the second-level controller associated with the natural-language instructions, for example, the second sub level controller 214*b* configured with the second policy. In this manner, a number of times that the first controller 212 can invoke the natural language based second sub level controller 214*b* is limited, based on the resource constraint. In an example, the resource constraint, i.e., a maximum number of times for querying the second sub level controller 214*b* may be set as n. In such a case, if the first level controller 212 invokes the second sub level controller 214*b* after n number of times, a penalty may be imposed on the first level controller 212. For example, the resource constraint for the maximum number of times for querying the second sub level controller 214*b* may be imposed on the first level controller 212 based on rewards collected by the first level controller 212.

In accordance with an example, a reward of '+1' may be assigned to perform an action that results in reduction of the geometric distance towards a goal or the goal state, a reward of '+10' may be assigned to perform an action that results in completion of an episode or the task successfully. Moreover, a penalty of '-0.01' is added per time step to encourage efficiency (i.e., to encourage reaching the goal faster). In addition, a negative reward may be set for each time the entity 150 queries from the oracle. Initially, a maximum number of queries n may be set and the negative reward for an $i^{th}$ query may be defined as:

$$R_q(i) = \begin{cases} -(i/n), & i < n \\ -1, & i > n \end{cases}$$

At 708, the first level controller 212 learns when to interact with the oracle directly using natural language. In particular, the first level controller 212 learns when to query the oracle based on its current observation and history information. Further, owing to the RL framework of the hierarchical multimodal RL neural network 209a, resource constraints or budget associated with querying of the oracle is predicted based on the reward or penalties assigned to the network. Specifically, an actor-critic model predicts the value function of each state of the hierarchical multimodal RL neural network. Further, policy training of the top-level policy, $\pi_{query}$, is done using decentralized distributed proximal policy optimization (DD-PPO) to learn when to query the oracle for natural language instructions. Subsequently, the first level controller 212 selects one of the at least two second level controllers 212, based on the resource constraint or budget, current observation, and other historic information. To this end, the first level controller is biased towards the selection of the first policy relating to audio or video based first modality. In an example, the first level controller 212 may try not to select the second sub level controller relating to the natural language based modality until it ascertains that the entity is not moving in the right direction, for example, when moving away from the goal, when fails to identify a direction towards the goal state based on current observation, when is lost, or when is wasting a lot of time. Therefore, the first level controller 212 may try to select the first sub level controller to collect more reward and incur less penalty.

Figure 8:
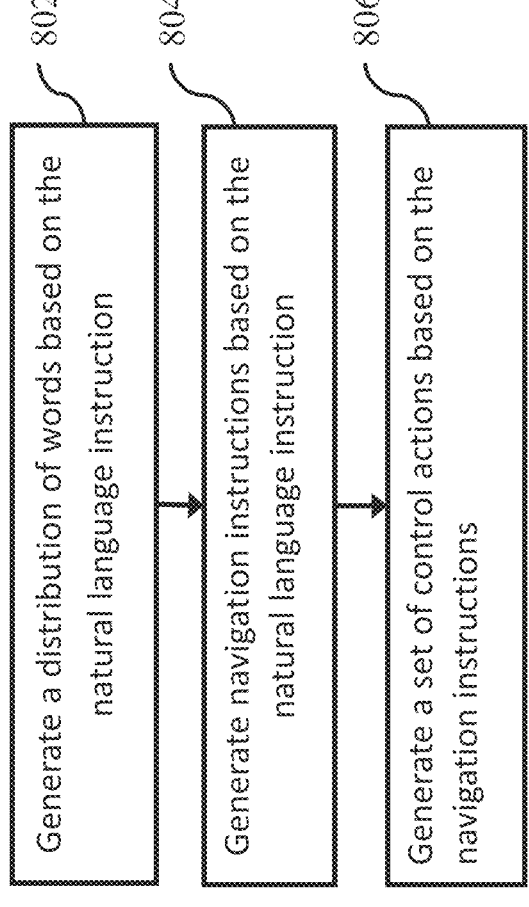
FIG. 8 shows a flowchart of a method for generating navigation instructions based on a natural language instruction, in accordance with an embodiment.

FIG. 8 shows a flowchart of a method for generating navigation instructions based on a natural language instruction, in accordance with an embodiment. It may be noted that datasets for vision and language task does not contain a fixed number of route and navigation instruction pairs. Moreover, the entity 150 may query an oracle for feedback at any point of a navigation graph. Hence, the hierarchical multimodal RL neural network 209a is required to model an oracle which can provide natural language feedback from any point on the navigation graph, given that the oracle knows the shortest path trajectory towards the goal from that navigating point or current pose of the entity 150. In this regard, using a fixed set of instructions may fail in case of selected second level controller being second sub level controller relating to natural language based modality. Specifically, a number of navigation instructions for the entity 150 that may be generated from the natural language instruction may not be fixed. To address this challenge, the words of the natural language instruction may have to be semantically understood to generate the navigation instructions for the entity 150. In this regard, a speaker model is used.

At 802, a distribution of words based on the natural language instruction is generated. For example, the speaker model may mimic the natural language and generate the distribution of words. The distribution of words may enable formation of a vision and language dataset. The distribution of words may be generated as: $p^S(w|r)$ given the shortest path trajectory as:

$$\tau = \langle (x_0, a_0), (x_1, a_1), \ldots, (x_n, a_n) \rangle$$

where $\tau$ is a sequence of observations $x_i$ and action pairs $a_i$. These observation and action pairs are sequentially encoded using an LSTM encoder as: $\langle f_0, f_1, \ldots, f_n \rangle$ =$ENC^S \langle ((x_0, a_0), (x_1, a_1), \ldots, (x_n, a_n)) \rangle$. The LSTM decoder attends over the encoded trajectory and predicts the next word of the instruction by:

$$w_t = DEC^S(w_{t-1}, \langle f_0, f_1, \ldots, f_n \rangle).$$

At 804, navigation instructions are generated based on the natural language instruction. In an example, an instruction generation model is trained to generate navigation instructions using the available (instruction, trajectory) pairs from the vision and language dataset. For example, during training of the instruction generation model, cross entropy loss and teacher forcing may be used.

At 806, a set of control actions are generated based on the navigation instructions. For example, the set of control actions may include instructions for actuators of the components of the entity 150 that enables the entity to navigate based on the identified navigation instructions.

Figure 9A:
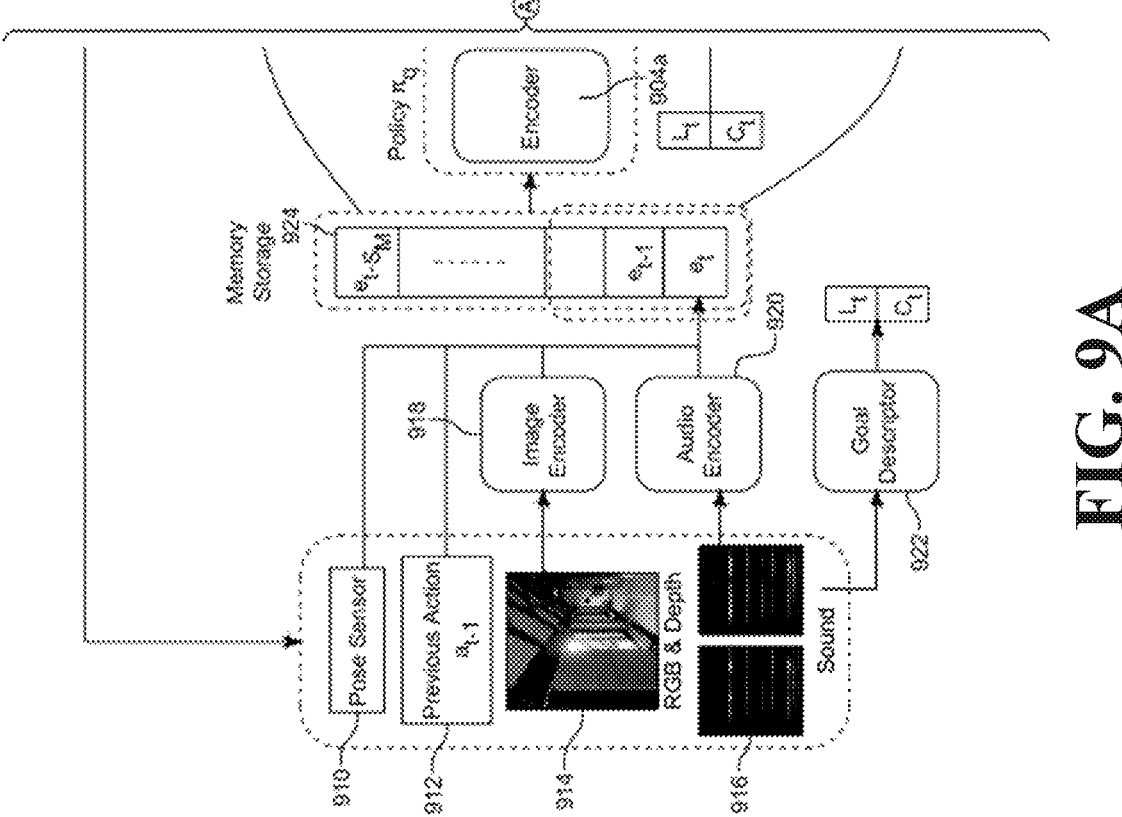
FIG. 9A and FIG. 9B illustrate block diagrams of an example system for obtaining a trained hierarchical multimodal neural network by Reinforcement Learning (RL), in accordance with an embodiment.
Figure 9B:
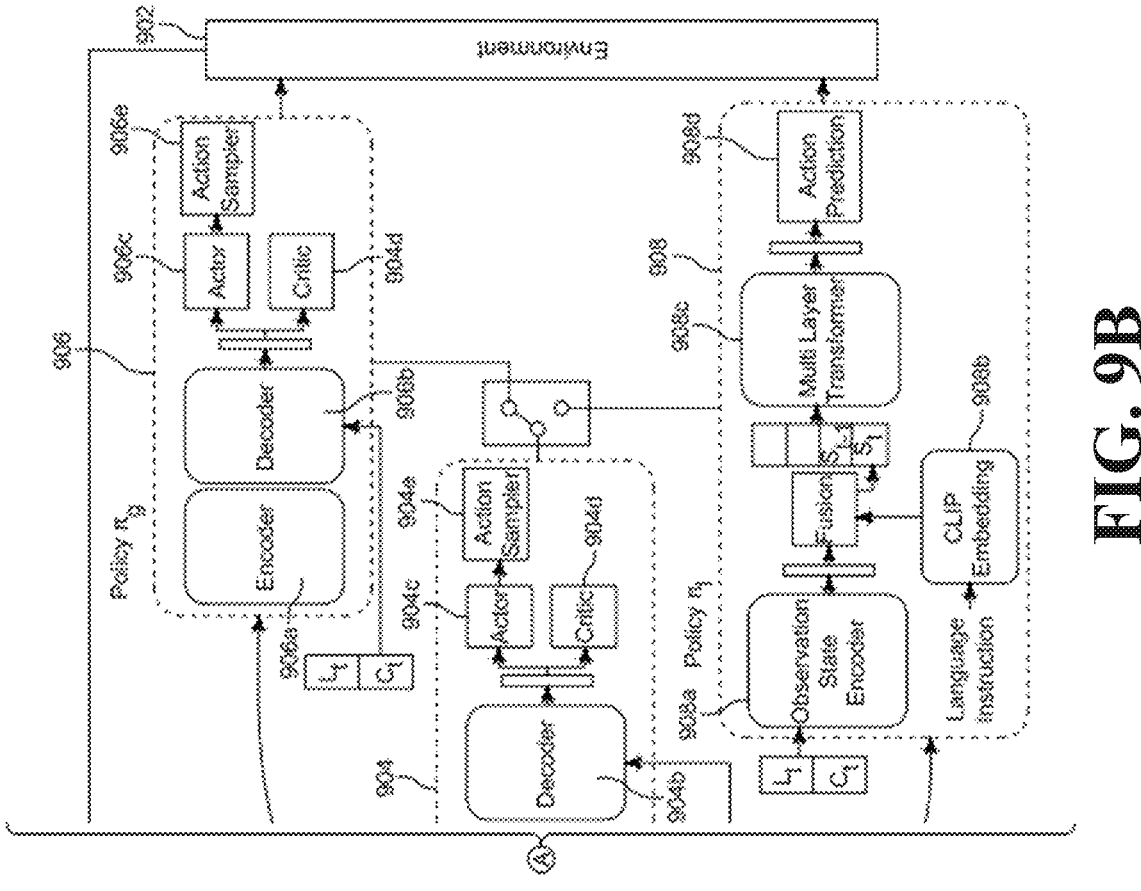

FIG. 9A and FIG. 9B illustrate block diagrams of an example system for obtaining a trained hierarchical multimodal neural network 209a by Reinforcement Learning (RL), in accordance with an embodiment. The hierarchical multimodal RL neural network 209a is configured to control the entity 150 for navigating in an environment, such as the environment 120 for reaching a goal state or completing a task. In an example, the hierarchical multimodal neural network 209a constructs a tree graph with nodes in a state space. The tree graph may have a finite number of configurations of the entity 150, wherein the tree graph may be generated for each of the task performed by the entity 150. In an example, the hierarchical multimodal RL neural network 209a learns to generate the tree graph for effectively controlling the entity 150.

For example, the hierarchical multimodal RL neural network 209a is implemented on a system comprising the first level controller 212 and two or more second level controllers 214. During implementation, a top-level policy 904, $\pi_{query}$, configured on the first level controller 212 is triggered to perform a task, such as a search task or a navigation task in an environment. In this regard, the top-level policy 904, $\pi_{query}$ is trained to select one of two lower level policies configured on the sub level controllers 214a and 214b for performing a sub-task associated with the task. Further, the two lower level policies configured on the second sub level controllers 214 are trained to determine navigation steps for the performing the corresponding sub-tasks. For example, the two lower level policies comprises a first policy 906, $\pi_{goal}$, configured in the first sub level controller 214a, and the second policy 908, $\pi_{vln}$, configured in the second sub level controller 214. The first policy 906, $\pi_{goal}$, may relate to a first modality and the second policy 908, $\pi_{vln}$, may relate to a second policy. According to embodiments of the present disclosure, the first modality may correspond to audio or video based modality, wherein the first policy 906, $\pi_{goal}$, configured with the first policy may generate navigation steps based on audio or video data acquired by sensors in the environment. Further, the second modality may correspond to vision-and-language based modality, wherein the second policy 908, $\pi_{vln}$, configured with the second policy may generate navigation steps based on natural language information acquired by querying an oracle in the environment.

Pursuant to present example, the training of the hierarchical multimodal RL neural network 209a is performed based on a training environment 902. During the training, sensors within the training environment 902 may acquire sensor data, which may be provided as input to the hierarchical multimodal RL neural network 209a. Input data for the training of the hierarchical multimodal RL neural network 209a associated with the training environment 902 may include, for example, pose data 910 measured by a pose sensor, previous action 912 performed by the entity 150, vision data 914 (such as RGB or depth images or videos), and audio data 916. For example, the training of the hierarchical multimodal RL neural network 209a may be performed using reinforcement learning, wherein each correct or desired operation performed by the hierarchical multimodal RL neural network 209a may be rewarded, whereas a penalty may be imposed for each incorrect or undesired operation.

Once the hierarchical multimodal RL neural network 209a receives the input data, the hierarchical multimodal RL neural network 209a is configured to encode the vision data 914 using an image encoder 918 and the audio data 916 using an audio encoder 920. For example, the vision data 914 may include image or video related information associated with the training environment 902, such as visual cues for navigating in the training environment 902. The audio data 916 may include audio related information associated with the training environment 902, such as audio or sound cues for navigating in the training environment 902.

Further, the audio data 914 may be used by a goal descriptor 922 to generate an encoded goal state $((L_t, C_t)$ for the task. Moreover, the input data comprising the pose data 910 indicating pose of the entity 150, previous action 912 performed by the entity 150, encoded vision data, and encoded audio data may be stored within a memory 924 for retrieval during the training. For example, the memory 924 may store input data corresponding to various observations in the training environment 902. The various observations may correspond to different states of the entity 150 in the navigation environment 150, such as initial state, target or goal state, and several intermittent states in the training environment 902.

To train the top-level policy 904, $\pi_{query}$, the input data and the goal state are provided as input. The top-level policy 904, $\pi_{query}$, associated with the first level controller 212 may have a transformer model. For example, self-attention may be implemented by transformer model for neural machine translation. The transformer model may follow an encoder-decoder structure without relying on the use of recurrence and convolutions. The encoder 904a of the top-level policy 904 may receive input data sequence corresponding to different states. The encoder 904a may map the input data sequence to a sequence of continuous representations, which is then fed into a decoder 904b. Further, the decoder 904b receives output of the encoder 904a together with decoder output at the previous time step and the goal state $((L_t, C_t)$ for the task to generate an output sequence. The output sequence is fed to an actor 904c and a critic 904d of actor-critic model of the top-level policy 904. The actor-critic model predicts a value function of each state of the hierarchical multimodal RL neural network 209a.

In addition, an action sampler 904e may sample an action from the output sequence to generate a control action. Further, policy training of the top-level policy, $\pi_{query}$, is done using decentralized distributed proximal policy optimization (DD-PPO) to learn when to navigate based on the input data, i.e., select the first policy, $\pi_{goal}$, and when to query the oracle for natural language instructions, i.e., select the second policy, $\pi_{vln}$.

To train the first policy (or first lower-level policy) 906, $\pi_{goal}$, the input data and the goal state are provided as input. The first policy 906, $\pi_{goal}$, associated with the first sub level controller 214a may have a transformer model following an encoder-decoder structure. The encoder 906a may receive input data sequence corresponding to different states. The encoder 906a may map the input data sequence to a sequence of continuous representations and fed it into a decoder 906b. Further, the decoder 906b receives output of the encoder 906a and the goal state $((L_t, C_t)$ for the task to generate an output sequence. The output sequence is fed to an actor 906c and a critic 906d of actor-critic model. The actor-critic model predicts a value function of each state of the hierarchical multimodal RL neural network 209a. Further, policy training comprises training an action sampler 906e. For example, the action sampler 906e is trained to generate a set of control actions. For example, the set of control actions may indicate a movement of the entity 150 in the training environment 150. Based on the generated set of control actions, and the actual navigation data for navigating in the training environment to reach the goal state, the hierarchical multi-modal neural network 209a may be rewarded or penalized.

In an example, an RL module in the top-level policy 904, $\pi_{query}$, and the first policy 906, $\pi_{goal}$, learns the value function in free space (without obstacles) through, for example, a soft actor-critic (SAC) algorithm. In particular, the actor-critic algorithm in the top-level policy 904, $\pi_{query}$, and the first policy 906, $\pi_{goal}$, may be SAC algorithm. The value functions for all possible configurations of the entity 150 are merged to give the neural network 209a. For example, the RL module of the top-level policy 904, $\pi_{query}$, may be configured to learn a navigation policy through the actor 904c, and a Q value function through the critic 904d, simultaneously. Moreover, the actor 904c, implementing the navigation policy, determines an action based on an entity state and the action sampler 904e. In a similar manner, an RL module in the first policy 906, $\pi_{goal}$, learns the value function in free space through a soft actor-critic (SAC) algorithm. For example, the RL module of the first policy 906, $\pi_{goal}$, may be configured to learn a navigation policy through the actor 906c, and a Q value function through the critic 906d, simultaneously. Moreover, the actor 906c, implementing the navigation policy, determines an action based on an entity state and the action sampler 906e. The simulated result after each initialization is called an "episode". Further, the critic 904d and 906d trains corresponding value function based on the action generated by the corresponding action sampler 904e or 906e, entity state, and reward.

Continuing further, to train the second policy (or first lower-level policy) 908, $\pi_{vln}$, the input data and the goal state are provided as input. The second policy 908, associated with the second sub level controller 214b may follow a two stage training. In an example, a first stage consists of an off-policy training. In this stage, fine-grained instructions to learn language-based second policy 908, $\pi_{vln}$, may be repurposed. Further, the second stage consists of on-policy training During rollouts in the hierarchical framework of the first level controller 212 having the top-level policy $\pi_{query}$, the entity 150 interacts with the oracle and receives language instructions. The instructions may be used to determine a shortest path trajectory towards the goal to fine-tune the second policy 908, $\pi_{vln}$. In both the stages, the second policy 908, $\pi_{vln}$, is trained with an Imitation Learning objective.

Given the input data including observations and the goal state descriptor, the second policy 908, $\pi_{vln}$, is trained to use self-attention to capture information from the input data sequence and encode a belief state corresponding to it. For example, a transformer based framework 908a obtains observations and memory information as input data for the transformer based framework 908a at any time step and encode it with the goal state. Further, the second policy 908 uses a Contrastive Language-Image Pre-Training (CLIP) model 908b to encode sentence instruction X. The CLIP model 908b comprises a neural network. The CLIP model 908b neural network is trained on different image and text pairs. The CLIP model 908b includes two sub-models, called encoders, including a text encoder and an image encoder. The text encoder embeds text into a mathematical space while the image encoder embeds images into a mathematical space. For example, using the CLIP model 908b the sentence instruction X may be fused with a current belief state (determined based on the input data and the goal state) using a simple feed forward network. Then, the fused belief state and language instruction X are processed with another transformer based framework 908c to obtain a final belief of the state, which is then used for computing the action distribution, using the action prediction module 908d. The second policy 908 employs the action prediction module 908d to sample a set of control actions from an action distribution and generate the set of control actions for navigation.

Based on the selection of lower-level policies and/or generation of the set of control actions by one of the lower-level policies, reward may be given when the entity 150 moves with respect to the goal state. Each episode terminates if any of the following condition is met: 1) when the maximum steps per episode MaxSteps is reached; 2) when the entity 150 goes out of a window centered at the goal. The parameters in the networks will be updated after every several episodes according to the reward obtained. The design of a reward function and the training process are crucial for the performance of the trained policies. The two objectives of the reward function are: encouraging the entity to go to the goal state as quickly as possible; and not discouraging exploration of the complicated entity 150 kinematics and control policy.

In accordance with an example, a reward of '+1' may be assigned to perform an action that results in reduction of a geometric distance towards a goal or the goal state, a reward of '+10' may be assigned to perform an action that results in completion of an episode or the task successfully. Moreover, a penalty of '−0.01' is added per time step to encourage efficiency (i.e., to encourage reaching the goal faster). In addition, a negative reward may be set for each time the entity 150 queries from the oracle. Initially, a maximum number of queries n may be set and the negative reward for an $i^{th}$ query may be defined as:

$$R_q(i) = \begin{cases} -(i/n), & i < n \\ -1, & i > n \end{cases}$$

The policies of the hierarchical multi-modal neural network 209a maximizes an expected return $E_\tau[\Sigma_t R\,(s_t,\,a_t)]$ over all trajectories $\tau$ while minimizing negative reward for asking the oracle for feedback. Some embodiments are based on a recognition that a notation for the reward function is to be included in the entity 150. The entity 150 having the trained hierarchical multi-modal neural network 209a interacts with its environment in discrete time steps. At each time t, the entity 150 receives an observation $o_t$, which typically includes a reward $r_t$. The controller 209 then chooses an action $a_t$ from a set of available actions to increase the reward, which is subsequently sent to the environment.

Figure 9C:
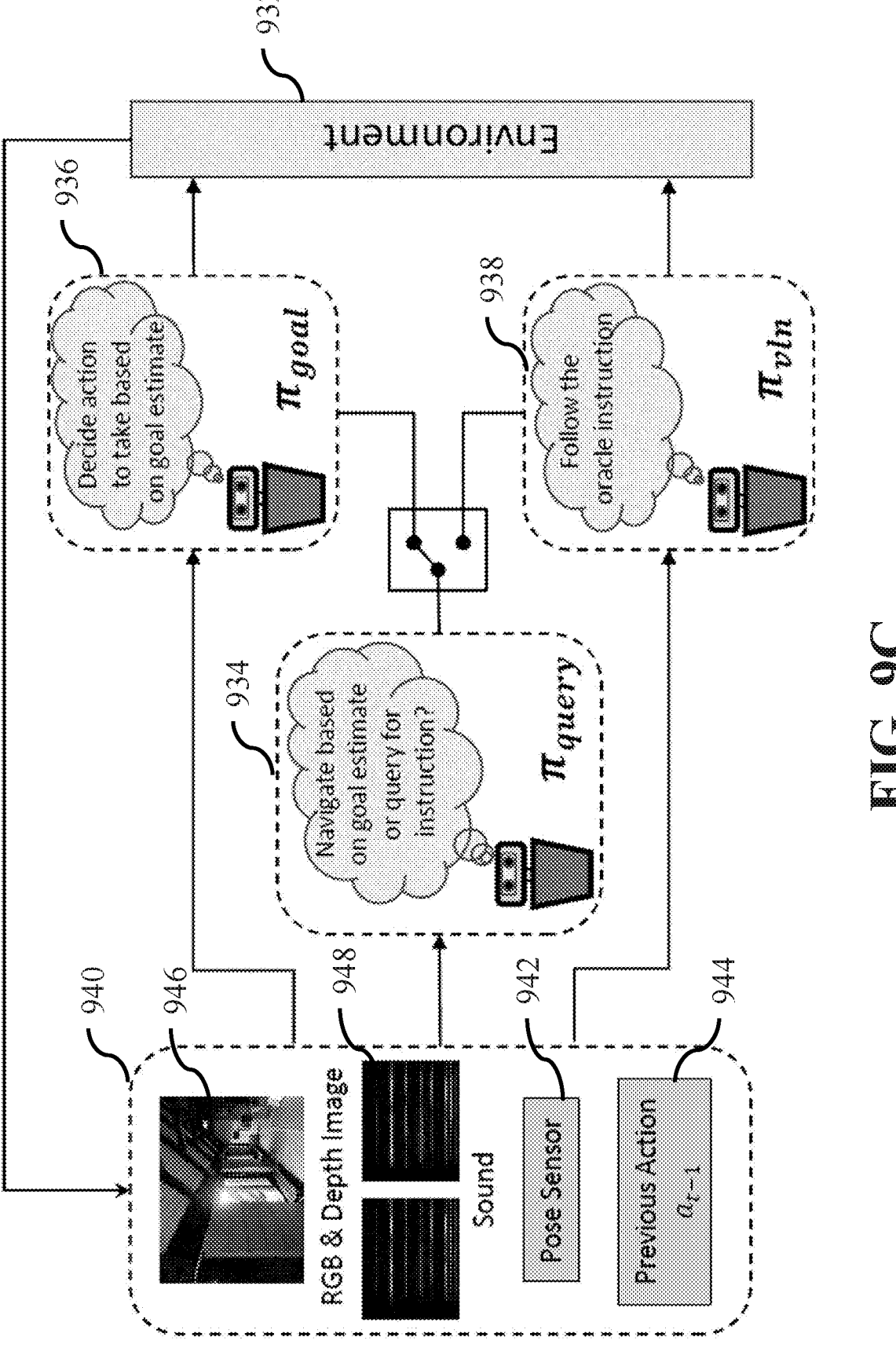
FIG. 9C illustrates a use case of a controller for controlling the entity for navigating in an environment, in accordance with an embodiment.

FIG. 9C shows a use case for the controller 209 for controlling the entity 150 for navigating in an environment 932, in accordance with an embodiment. In the present example, the hierarchical multimodal RL neural network 209a is used to control the entity 150. In hierarchical multimodal RL neural network 209a, the modalities are segregated into multiple policies, for example, one policy for each modality. The hierarchical multimodal RL neural network 209a includes a first level controller 934 to select among the policies. The first level controller 934 is configured with the top-level policy 904, $\pi_{query}$. The top-level policy 904, $\pi_{query}$, is trained to learn to decide when to make a query in natural language and when to navigate based on audio or video information received from sensor corresponding to the current state and the goal estimate. A manner in which the top-level policy 904, $\pi_{query}$, learns when to make the query for natural language input is described above in FIG. 7.

Once the top-level policy 904, $\pi_{query}$, chooses a modality, then a corresponding low-level navigation policy may be invoked. In an example, the top-level policy 904, $\pi_{query}$, chooses the modality based on current state of the hierarchical multimodal RL neural network 209a, input data 940 relating to current observation of the environment 932, reward, budget or resource constraints associated with the modalities, goal estimate or goal descriptor of the goal state, and other history information. For example, the input data 940 obtained from the current observation of the environment 932 may include, but is not limited to, vision data 946 (such as RGB or depth images or videos), audio data 948, pose data 942 measured by a pose sensor, and previous action 944 performed by the entity 150.

Further, the controller 209 comprises at least two low-level navigation policies which may be executed for a finite number of steps, for which the entity 150 will navigate. In accordance with embodiments of the present disclosure, the low-level policies include the first policy 906, $\pi_{goal}$, relating to audio or video based modality, and the second policy 908, $\pi_{vln}$, relating to natural language-based modality. To this end, a first sub level controller 936 is configured with the first policy 906, $\pi_{goal}$, and a second sub level controller 938 is configured with the second policy 908, $\pi_{vln}$. For example, based on the selected low-level policy 906 or 908, the entity 150 may perform a sub task associated with the navigation task. A manner in which the first sub level controller 936 and the second sub level controller 938 perform the subtask is explained in detail in conjunction with FIGS. 6A and 6B. Once the sub task is completed, the selected low-level policy 906 or 908 may give control back to the first level controller 934 to choose another modality to use for performing another sub task associated with the navigation task. This process is repeated until the entity reaches the goal.

As the entity 150 may navigate in the partially observable environment 932, it keeps a distribution of its belief of its state. In an example, the belief is kept in a memory as a neural embedding. When the top-level policy 904, $\pi_{query}$, chooses the audio or video based modality, the first policy 906, $\pi_{goal}$, gets invoked for navigation. As the first policy 906, $\pi_{goal}$, is a single-step policy (such as the audio-visual navigation), the entity 150 may update its belief memory for every step of the finite number of steps performed by the entity 150. However, when the top-level policy 904, $\pi_{query}$, chooses the natural language based modality, the second policy 908, $\pi_{vln}$, gets invoked for navigation. As the second policy 908, $\pi_{vln}$, is a multi-step policy (such as language navigation), the entity 150 may use the existing memory and its language instruction to produce a new belief of the environment 932. In this manner, the entity 150 is assumes that natural language is a semantically superior modality. Thereafter, the entity 150 clears its current belief history, and resets it to the new belief. The new belief is then extended as the entity 150 continues to navigate using the second policy 908 until the control is given back to the top-level policy 904, it query. Such an update of the belief allows using a semantically superior belief to override a modality when the controller decide that the inferior modality is too noisy or unreliable, and the belief update provides a way to synchronize different beliefs for cooperative multimodal navigation.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure.

Therefore, it is the object of the appended claims to cover all such variations and modifications as come within the true spirit and scope of the disclosure.

What is claimed is:

1. A controller for controlling an entity, comprising:
   a memory to store a hierarchical multimodal reinforcement learning (RL) neural network, wherein the hierarchical multimodal RL neural network includes a first level controller and at least two second level controllers, the at least two second level controllers comprising at least a first sub level controller relating to a first modality and a second sub level controller relating to a second modality, wherein the first modality is different from the second modality; and
   a processor configured to:
      select, using the first level controller, one of the at least two second level controllers to perform a first sub-task relating to a task, based at least on input data, and a state of the hierarchical multimodal RL neural network, wherein the task is broken down into one or more sub-tasks, the one or more sub-tasks comprising at least the first sub-task, wherein the at least two second level controllers each perform a same task type under different modalities;

cause the selected second level controller from the at least two second level controllers to determine a set of control actions to perform the first sub-task; and
      control the entity based on the set of control actions determined by the selected second level controller.

2. The controller of claim 1, wherein the processor is further configured to:
   update, using the selected second level controller, the state of the hierarchical multimodal RL neural network on the execution of the first sub-task; and
   select, using the first level controller, one of the at least two second level controllers to perform a second sub-task relating to the task, based at least on the input data, a previous state of the hierarchical multimodal RL neural network and the updated state of the hierarchical multimodal RL neural network, wherein the second sub-task is performed after the first sub-task for completing the task.

3. The controller of claim 1, wherein the processor is configured to:
   determine a resource constraint associated with selection of each of the at least two second level controllers; and
   select, using the first level controller, one of the at least two second level controllers, based on the resource constraint.

4. The controller of claim 1, wherein at least one of: the input data or the state of the hierarchical multimodal RL neural network, as used by the first sub level controller relating to the first modality and the second sub level controller relating to the second modality, are different.

5. The controller of claim 1, wherein the first sub level controller is configured to determine the set of control actions based on video information, and wherein the second sub level controller is configured to determine the set of control actions based on audio information.

6. The controller of claim 1, wherein the first modality relating to the first sub level controller is an audio or video based modality and the second modality relating to the second sub level controller is a natural language-based modality.

7. The controller of claim 6, wherein the first level controller is biased towards the selection of the first sub level controller.

8. The controller of claim 6, wherein
   the first sub level controller is configured to determine the set of control actions based on at least one of: sensor-based audio information or sensor-based video information, and
   the second sub level controller is configured to determine the set of control actions based on a natural language instruction.

9. The controller of claim 8, wherein, when the selected second level controller is the first sub level controller relating to the first modality, the processor is further configured to:
   determine the set of control actions based at least on a first set of state variables associated with the state of the hierarchical multimodal RL neural network and the input data, wherein the input data includes at least one of: the sensor-based audio information, or the sensor-based video information, using the first sub level controller relating to the first modality comprising goal estimate-based modality; and
   update, using the first sub level controller, the first set of state variables based on the execution of the first sub-task.

10. The controller of claim 9, wherein, when the selected second level controller is the second sub level controller relating to the second modality comprising natural language-based modality, the processor is further configured to:

determine the set of control actions based at least on a second set of state variables associated with the state of the hierarchical multimodal RL neural network and the input data, wherein the input data includes the natural language instruction, using the second sub level controller, wherein the first set of state variables is different than the second set of state variables; and update, using the second sub level controller, the second set of state variables based on the execution of the first sub-task.

11. The controller of claim 2, wherein the processor is configured to:

determine a belief state associated with the hierarchical multimodal RL neural network; and modify, using the selected second level controller, the belief state of the hierarchical multimodal RL neural network based on the updated state of the hierarchical multimodal RL neural network and the execution of the first sub-task.

12. The controller of claim 11, wherein, when the selected second level controller is the second sub level controller relating to the second modality and the second modality is a natural language-based modality, the processor is further configured to:

generate, using the second sub level controller, a new belief state based on the execution of the set of control actions associated with the first sub-task; and clear a current belief state, using the second sub level controller.

13. The controller of claim 1, wherein the first level controller uses a learned policy having a reinforcement learning network to determine when to select one of the at least two second level controllers.

14. The controller of claim 1, wherein the task is a navigation task for navigation of the entity from an initial state to a target state.

15. The controller of claim 14, wherein the first modality relating to the first sub level controller is an audio or video based modality and the second modality relating to the second sub level controller is a natural language-based modality, and wherein when the first level controller selects the first sub level controller, the first sub level controller is configured to control a navigation of the entity based on sensor-based information; and when the first level controller selects the second sub level controller, the second sub level controller causes the entity to query for natural language embodied navigation instructions, and the second sub level controller is configured to control the navigation of the entity based on a natural language instruction.

16. A method for controlling an entity, the method comprising:

selecting, using a first level controller, one of at least two second level controllers to perform a first sub-task relating to a task, based at least on input data, and a state of a hierarchical multimodal reinforcement learning neural network, wherein the hierarchical multimodal reinforcement learning neural network includes the first level controller and the at least two second level controllers, the at least two second level controllers comprises at least a first sub level controller relating to a first modality and a second sub level controller relating to a second modality, and the first modality is different from the second modality;

causing the selected second level controller from the at least two second level controllers to determine a set of control actions to execute the first sub-task, wherein the task is broken down into one or more sub-tasks, the one or more sub-tasks comprising at least the first sub-task, wherein the at least two second level controllers each perform a same task type under different modalities; and controlling the entity based on the set of control actions determined by the selected second level controller.

17. The method of claim 16, further comprising:

determining a resource constraint associated with selection of each of the at least two second level controllers;

selecting, using the first level controller, one of the at least two second level controllers to execute the first sub-task, based on the resource constraint; and updating the state of the hierarchical multimodal reinforcement learning neural network on the execution of the first sub-task.

18. The method of claim 16, wherein the first modality relating to the first sub level controller is a goal estimate-based modality and the second modality relating to the second sub level controller is a natural language-based modality, and wherein the method further comprises:

determining, using the first sub level controller, the set of control actions based on at least one of: sensor-based audio information or sensor-based video information, and determining, using the second sub level controller, the set of control actions based on a natural language instruction.

19. The method of claim 16, wherein at least one of: input data or the state of the hierarchical multimodal reinforcement learning neural network used by the first sub level controller and the second sub level controller are different, and wherein the method further comprises:

determining the set of control actions, based on one of: a first set of state variables associated with the state of the hierarchical multimodal reinforcement learning neural network using the first sub level controller, or a second set of state variables associated with the state of the hierarchical multimodal reinforcement learning neural network using the second sub level controller, wherein the first set of state variables is different from the second set of state variables.

20. A non-transitory computer readable storage medium embodied thereon a program executable by a processor for performing a method, the method comprising:

selecting, using a first level controller, one of at least two second level controllers to perform a first sub-task relating to a task, based at least on input data, and a state of a hierarchical multimodal reinforcement learning neural network, wherein the hierarchical multimodal reinforcement learning neural network includes the first level controller and the at least two second level controllers, the at least two second level controllers comprises at least a first sub level controller relating to a first modality and a second sub level controller relating to a second modality, and the first modality is different from the second modality, wherein the task is broken down into one or more sub-tasks, the one or more sub-tasks comprising at least the first sub-task, wherein the at least two second level controllers each perform a same task type under different modalities;

causing the selected second level controller from the at least two second level controllers to determine a set of control actions to execute the first sub-task; and controlling the entity based on the set of control actions determined by the selected second level controller.

\* \* \* \* \*